US012642718B2

(12) United States Patent
Wojdyla et al.

(10) Patent No.: US 12,642,718 B2
(45) Date of Patent: Jun. 2, 2026

(54) WHEELCHAIR DOCKING SYSTEM AND METHOD THEREOF

(71) Applicant: The Braun Corporation, Winamac, IN (US)

(72) Inventors: Adam Wojdyla, Winamac, IN (US); Michael R. Pugh, Winamac, IN (US); Carlos Badallo, Bloomfield, MI (US)

(73) Assignee: The Braun Corporation, Winamac, IN (US)

(*) Notice: Subject to any disclaimer, the term of this patent is extended or adjusted under 35 U.S.C. 154(b) by 1054 days.

(21) Appl. No.: 17/576,211

(22) Filed: Jan. 14, 2022

(65) Prior Publication Data

US 2022/0133557 A1 May 5, 2022

Related U.S. Application Data

(63) Continuation-in-part of application No. 17/403,091, filed on Aug. 16, 2021, which is a
(Continued)

(51) Int. Cl.
*B60P 7/08* (2006.01)
*A61G 3/08* (2006.01)

(52) U.S. Cl.
CPC .................................. *A61G 3/0808* (2013.01)

(58) Field of Classification Search
CPC ..... B60P 7/0807; B60P 7/0815; B60P 7/0892; B60P 3/06; A61G 3/0808
(Continued)

(56) References Cited

U.S. PATENT DOCUMENTS 3,986,459 A * 10/1976 Riley .................... B61D 33/00
410/105
4,688,843 A 8/1987 Hall
(Continued)

FOREIGN PATENT DOCUMENTS

EP 1656919 A2 5/2006
EP 1736356 B1 4/2008
(Continued)

OTHER PUBLICATIONS

International Search Authority for the PCT (European Patent Office), International Search Report and Written Opinion for PCT/US2022/040337 dated Nov. 3, 2022.
(Continued)

*Primary Examiner* — Stephen T Gordon
(74) *Attorney, Agent, or Firm* — Daniel A. Tallitsch; Tyler Schultz

(57) ABSTRACT

A wheelchair docking system including a frame having an upper portion and a lower portion, the upper portion being movable relative to the lower portion between a lowered position and a raised position. A coupler mechanism engages a wheelchair during a docking operation. The system also includes a first latching mechanism being movable between a retracted position and a latching position such that the first latching mechanism is spaced from the coupler mechanism. A second latching mechanism moves the upper portion of the frame between its lowered position and raised position. The first latching mechanism is partially retracted by a wheelchair during the docking operation, and the first latching mechanism is biased to its latching position when the coupler mechanism engages the wheelchair.

20 Claims, 23 Drawing Sheets

Related U.S. Application Data continuation-in-part of application No. 16/952,464, filed on Nov. 19, 2020, which is a continuation-in-part of application No. 16/909,243, filed on Jun. 23, 2020, now Pat. No. 11,759,378.

(60) Provisional application No. 62/866,064, filed on Jun. 25, 2019.

(58) Field of Classification Search
USPC .................. 410/7–9, 19, 22, 51; 297/DIG. 4
See application file for complete search history.

(56) References Cited

U.S. PATENT DOCUMENTS

| | | | | |
|---|---|---|---|---|
| 4,754,946 | A * | 7/1988 | Constantin | A61G 3/0808 248/503.1 |
| 5,344,265 | A * | 9/1994 | Ullman | A61G 3/0808 410/3 |
| 5,489,170 | A | 2/1996 | Inoue et al. | |
| 6,260,813 | B1 | 7/2001 | Whitcomb | |
| 7,717,655 | B2 * | 5/2010 | Cardona | A61G 3/0808 410/7 |
| 9,333,129 | B2 | 5/2016 | Cardona et al. | |
| 11,759,378 | B2 | 9/2023 | Wojdyla et al. | |
| 2005/0214089 | A1 | 9/2005 | Girardin | |
| 2005/0238453 | A1 * | 10/2005 | Lemay | A61G 3/0808 410/7 |
| 2006/0159542 | A1 * | 7/2006 | Ditch | A61G 3/0808 410/7 |
| 2009/0214314 | A1 | 8/2009 | Girardin et al. | |
| 2011/0123286 | A1 | 5/2011 | Van Roosmalen et al. | |
| 2016/0221607 | A1 | 8/2016 | Schmidt | |
| 2018/0347742 | A1 | 12/2018 | Chinn et al. | |
| 2020/0405550 | A1 | 12/2020 | Wojdyla et al. | |
| 2021/0069038 | A1 | 3/2021 | Wojdyla et al. | |

FOREIGN PATENT DOCUMENTS

| | | | |
|---|---|---|---|
| KR | 10-0439802 | B1 | 7/2004 |
| WO | 2018184884 | A1 | 10/2018 |

OTHER PUBLICATIONS

Internal Search Report and Written Opinion of the International Searching Authority, PCT/US2023/060235, 10 pages, May 9, 2023, International Searching Authority for the European Patent Office.

* cited by examiner

WHEELCHAIR DOCKING SYSTEM AND METHOD THEREOF

RELATED APPLICATIONS

This application is a continuation-in-part of U.S. patent application Ser. No. 17/403,091, filed Aug. 16, 2021, which is a continuation-in-part of U.S. patent application Ser. No. 16/952,464, filed Nov. 19, 2020, which is a continuation-in-part of U.S. patent application Ser. No. 16/909,243, filed Jun. 23, 2020, which claims the benefit of U.S. Provisional Patent Application Ser. No. 62/866,064, filed Jun. 25, 2019, entitled "Wheelchair Docking System and Method Thereof," the disclosures of which are hereby incorporated by reference in their entirety.

FIELD OF THE DISCLOSURE

The present application relates to a passenger vehicle for transporting one or more passengers, and more particularly to a docking system for releasably coupling a wheelchair to a floor in a vehicle.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van or bus is retrofitted with a ramp to enable a physically limited individual using a wheelchair to enter and exit the vehicle without the assistance of another individual.

Other known products for retrofitting a vehicle, such as a van, bus, sport-utility vehicle, or motor coach, include wheel chair lifts, lift platforms, ramps, wheelchair docks, securement systems, and lowered floor surfaces. In some instances, a floor of an original equipment manufacturer (OEM) vehicle is completely removed and replaced, lowered or otherwise modified to accommodate the entry and exit of the physically limited individual through a side door or entrance of the vehicle.

SUMMARY

In a first embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; and a second latching mechanism for moving the upper portion of the frame between its lowered position and raised position; wherein, the first latching mechanism is partially retracted by a wheelchair during the docking operation;

wherein, the first latching mechanism is biased to its latching position when the coupler mechanism engages the wheelchair.

In a first example of this embodiment, the first latching mechanism is biased to its latching position by a spring. In a second example, the first latching mechanism comprises a locking pin. In a third example, an actuator is coupled to the locking pin, the actuator being operably actuated between an extended position and a retracted position to move the locking pin between its latching position and its retracted position.

In a fourth example, a first scissor assembly is operably coupled between the upper portion and the lower portion; and a second scissor assembly operable coupled between the upper portion and the lower portion, the second scissor assembly being spaced longitudinally from the first scissor assembly. In a fifth example, the first scissor assembly and the second scissor assembly each includes a first leg and a second leg, the first leg and second leg being coupled to one another via a connection pin. In a sixth example, the first leg is disposed outwardly of the second leg.

In a seventh example, the first leg is coupled to an external location of the upper portion and an internal location of the bottom portion; the second leg is coupled to an internal location of the upper and lower portions. In an eighth example, one end of the first leg is affixed to the lower portion and an opposite end is slidably coupled to the upper portion; one end of the second leg is affixed to the upper portion and an opposite end is slidably coupled to the lower portion. In a ninth example, the second leg of the first scissor assembly is coupled to the second leg of the second scissor assembly via a longitudinal member.

In a tenth example, the first or second scissor assembly is coupled to a cross member. In an eleventh example, an actuator is coupled to the cross member, the actuator being operably actuated between an extended position and a retracted position to move the cross member longitudinally; wherein, as the cross member moves longitudinally, the upper portion of the frame moves between its lowered position and raised position.

In another embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; a second latching mechanism for moving the upper portion of the frame between its lowered position and raised position; a first release mechanism for operably controlling movement of the first latching mechanism; and a second release mechanism for operably controlling the second latching mechanism to move the upper portion from its lowered position to its raised position.

In one example of this embodiment, an actuator is coupled to the first latching mechanism, the actuator being operably actuated between an extended position and a retracted position to move the first latching mechanism between its latching position and its retracted position. In a second example, the first release mechanism includes a user control for communicating with a controller, the controller operably actuating the actuator between its extended and retracted positions; a plate coupled to the first latching mechanism via a pin, the plate being coupled to the actuator; a spring for biasing the first latching mechanism to its latching position; wherein, upon receiving a command from the user control to enable the first release mechanism, the controller operably actuates the actuator which moves the plate for compressing the spring; wherein, as the spring compresses, the first latching mechanism moves from its latching position to its retracted position.

In another example, the first latching mechanism and the second latching mechanism comprise manually-operable cables. In a further example, the second release mechanism includes a cable operably coupled to a plate having a slot defined therein; a pin disposed within the slot for movement therein from a first position to a second position; an actuator for operably controlling the upper portion between its lowered position and its raised position, the actuator comprising a rod operably coupled to the pin; wherein, in the lowered position, the pin is disposed at a first end of the slot and the actuator is in a retracted position; wherein, as the cable is pulled, the pin moves from the first end to a second end of the slot, where movement of the pin from the first end to the second end induces the rod to extend in a longitudinal direction; further wherein, movement of the rod in the longitudinal direction induces the upper portion to move from its lowered position to its raised position.

In yet another example, the system includes a first scissor assembly operably coupled between the upper portion and the lower portion; and a second scissor assembly operable coupled between the upper portion and the lower portion, the second scissor assembly being spaced longitudinally from the first scissor assembly; wherein, as the actuator moves from its retracted position to an extended position, the first and second scissor assemblies induce the movement of the upper portion from its lowered position to its raised position.

In a further embodiment of the present disclosure, a wheelchair docking system for being coupled to a floor includes a frame having an upper portion and a lower portion, the upper portion being movable relative to the lower portion between a lowered position and a raised position; a coupler mechanism configured to engage a wheelchair during a docking operation, the coupler mechanism being positioned on the upper portion; a first latching mechanism being movable between a retracted position and a latching position, the first latching mechanism spaced from the coupler mechanism; a second latching mechanism for moving the upper portion of the frame between its lowered position and raised position; a first tether assembly comprising a first tether strap coupled at one end to the lower portion and at an opposite end to the upper portion, the first tether assembly positioned at a rear end of the frame; and a second tether assembly comprising a second tether strap coupled at one end to the lower portion and at an opposite end to the upper portion, the second tether assembly positioned at a front end of the frame.

In an example of this embodiment, the system may include a bracket mounted to the lower portion of the frame; and a pin coupled to the mounting bracket; wherein, the first tether strap is coupled to the pin at the one end.

In an alternative embodiment, a wheelchair docking system for being coupled to a track system coupled to a vehicle floor includes a frame having an upper portion and a lower portion, the upper portion being movable relative to the lower portion between a lowered position and a raised position; a coupler mechanism configured to engage a wheelchair during a docking operation; a bottom panel of the lower portion of the frame comprising a plurality of openings defined therein; a flange integrally formed in the lower portion of the frame, the flange comprising a plurality of openings defined therein; and an adjustable latch coupled to the lower portion via one of the plurality of openings in the flange, the adjustable latch releasably coupled to the track system.

In a first example, the adjustable latch is adjustably coupled to one of the plurality of openings in the flange. In a second example, the plurality of openings is equally spaced and defined laterally in the flange to provide for a laterally adjustable coupling between the lower portion and the track system. In a third example, the plurality of openings in the bottom panel are equally spaced and defined laterally therein. In a fourth example, each of the plurality of openings defined in the flange are aligned longitudinally with at least one of the plurality of openings defined in the bottom panel.

In a fifth example, a body of the adjustable latch with a defined opening; and a fastener coupled to the body via the defined opening, wherein the fastener is disposed through the one of the plurality of openings in the flange and the defined opening in the body for coupling the adjustable latch to the lower portion. In a sixth example, the adjustable latch comprises a tab portion, a first post and a second post, the tab portion being slidable in a generally vertical direction to releasably couple the adjustable latch to the track system. In a seventh example, the tab portion is adjustable between a raised position and a lowered position, where in the lowered position the docking system is coupled to and inhibited from longitudinal movement relative to the track system, and in the raised position the docking system is longitudinally moveable relative to the track system.

In an eighth example, at least one retaining pin includes a neck portion and a retaining end, the at least one fastener coupling the bottom panel to the track system. In a ninth example, the neck portion is disposed within one of the plurality of openings in the bottom panel.

In another embodiment, a vehicle includes an interior cabin; a vehicle floor located in the cabin; a track system comprising at least one track, the at least one track including a plurality of receptacles and an elongated channel defined therein between a first end and a second end of the at least one track; a wheelchair docking system adjustably coupled to the track system, the wheelchair docking system comprising a frame having an upper portion and a lower portion, a coupler mechanism configured to engage a wheelchair during a docking operation, a bottom panel of the lower portion comprising a plurality of openings defined therein, and a flange integrally formed in the lower portion of the frame; and a latch adjustably coupling the wheelchair docking system to the track system, the latch being coupled to the lower portion via the flange; wherein, each of the plurality of receptacles are equally spaced from an adjacent receptacle; wherein, the flange comprises a plurality of openings defined therein such that the latch is coupled to the docking system via one of the plurality of openings in the flange.

In one example of this embodiment, the track system is mounted directly to a top surface of the vehicle floor. In another example, the plurality of openings in the flange and the plurality of openings in the bottom panel are equally spaced and defined laterally to provide for a laterally adjustable coupling between the docking system and the track system. In yet another example, each of the plurality of openings defined in the flange are longitudinally aligned with at least one of the plurality of openings defined in the bottom panel.

In a further example, the latch comprises a body with an opening defined therein; a tab portion being slidable in a generally vertical direction to releasably couple the latch to the track system; a first post and a second post; and a fastener coupled to the body via the defined opening, wherein the fastener is disposed through the one of the plurality of openings in the flange and the opening in the body for coupling the latch to the docking system. Related thereto, the tab portion is adjustable between a raised position and a lowered position, where in the lowered position the tab portion is disposed within a first receptacle of the plurality of receptacles of the at least one track, and in the raised position the tab portion is released from the first receptacle such that the docking system and latch are longitudinally moveable relative to the track system.

In yet a further example, at least one retaining pin includes a neck portion and a retaining end, the at least one fastener coupling the bottom panel to the track system. Moreover, the neck portion is aligned with and disposed within one of the plurality of openings in the bottom panel and the channel of the at least one track; the retaining end is disposed within one of the receptacles of the plurality of receptacles. Further, related to this embodiment, the at least one track comprises a first track and a second track, the first track and second track being laterally spaced from one another and coupled to the vehicle floor.

In a further embodiment of the present disclosure, a docking assembly for coupling a wheelchair to a floor of a vehicle includes a track system comprising a first track and a second track, the first and second tracks each including a first end, a second end, a plurality of receptacles, and an elongated channel defined therein between the first end and the second end; a wheelchair docking system adjustably coupled to the track system, the wheelchair docking system comprising a frame having an upper portion and a lower portion, a coupler mechanism configured to engage the wheelchair, a bottom panel of the lower portion comprising a plurality of openings defined therein, and a flange integrally formed with the lower portion of the frame; a first fastener adjustably coupling the wheelchair docking system to the first track, the first fastener being coupled to the frame via the flange; and a second fastener adjustably coupling the wheelchair docking system to the second track, the second fastener being coupled to the frame via the flange.

In one example of this embodiment, each of the first and second fasteners includes a tee-bolt, where the tee-bolt comprises an elongated member and at least one stud extending therefrom.

In yet another embodiment of the present disclosure, a multi-directional docking system for coupling to a wheelchair includes a frame, a coupling device coupled to the frame, the coupling device comprising a first portion and a second portion, and a first leg assembly and a second leg assembly formed by the first portion and the second portion. The first leg assembly and second leg assembly define an opening for receiving a coupling mechanism on the wheelchair.

In one example of this embodiment, a third leg assembly and a fourth leg assembly are formed by the first portion and the second portion, and the third leg assembly and fourth leg assembly define a second opening for receiving the coupling mechanism on the wheelchair. In a second example, the first opening is formed at a first end of the coupling device, and the second opening is formed at a second end thereof. In a third example, the first opening is approximately 180° spaced from the second opening. In a fourth example, the first opening is radially offset from the second opening.

In a further example of this embodiment, a plurality of leg assemblies is formed by the first and second portions of the coupling device, the plurality of leg assemblies forming a plurality of openings configured to receive the coupling mechanism on the wheelchair. In this embodiment, the coupling device may be mechanically coupled to the frame via one or more fasteners or welded thereto.

In an alternative embodiment, a transport vehicle may include a floor, a track system coupled to the floor and comprising at least one track, the at least one track including a plurality of receptacles and an elongated channel defined therein between a first end and a second end of the at least one track, and a multi-directional docking system adjustably coupled to the track system. The multi-directional wheelchair docking system includes a frame and a coupling device coupled to the frame, wherein the coupling device has a first portion and a second portion. A first leg assembly and a second leg assembly are formed by the first portion and the second portion of the coupling device, wherein the first leg assembly and second leg assembly define an opening. A wheelchair is configured to be removably coupled to the docking station, where the wheelchair includes a frame, at least one wheel coupled to the frame, and a coupling mechanism. In a coupled configuration, for example, the coupling mechanism is received in the opening of the coupling device for coupling the wheelchair to the docking system.

In one example of this embodiment, the coupling device includes a third leg assembly and a fourth leg assembly formed by the first portion and the second portion such that the third leg assembly and fourth leg assembly define a second opening for receiving the coupling mechanism on the wheelchair. In a second example, the first opening is formed at a first end of the coupling device, and the second opening is formed at a second end thereof. In a third example, the first opening is approximately 180° spaced from the second opening. In a fourth example, the first opening is radially offset from the second opening.

In another example of this embodiment, a plurality of leg assemblies is formed by the first and second portions of the coupling device such that the plurality of leg assemblies form a plurality of openings configured to receive the coupling device on the wheelchair. In a different example, the coupling device is mechanically coupled to the frame via one or more fasteners or welded thereto. In yet another example, the multi-directional docking station includes a locking mechanism for coupling the wheelchair to the docking station. In a further example, the coupling mechanism may be coupled to a bottom portion of the wheelchair. Here, the coupling mechanism may have a first portion and a second portion such that the first portion is coupled directly to the bottom portion of the wheelchair and is radially smaller than the second portion. Moreover, a sensor may be provided for detecting a position of the coupling mechanism of the wheelchair relative to the coupling device.

In yet a further embodiment of the present disclosure, a system for restricting movement of a wheelchair may include a multi-directional docking system having a frame and a coupling device coupled to the frame, wherein the coupling device comprises a first portion and a second portion. A first leg assembly and a second leg assembly are formed by the first portion and the second portion of the coupling device, wherein the first leg assembly and second leg assembly define a first opening. Further, a third leg assembly and a fourth leg assembly are formed by the first portion and the second portion of the coupling device, wherein the third leg assembly and fourth leg assembly define a second opening for receiving the coupling mechanism on the wheelchair. A releasably engageable locking mechanism is provided for coupling the wheelchair to the docking station. In a coupled configuration, the coupling mechanism is received in the first opening or the second opening of the coupling device.

In one example of this embodiment, in the coupled configuration, the releasably engageable locking mechanism is engaged for coupling the wheelchair to the docking system. In another example, the first opening is radially offset from the second opening.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
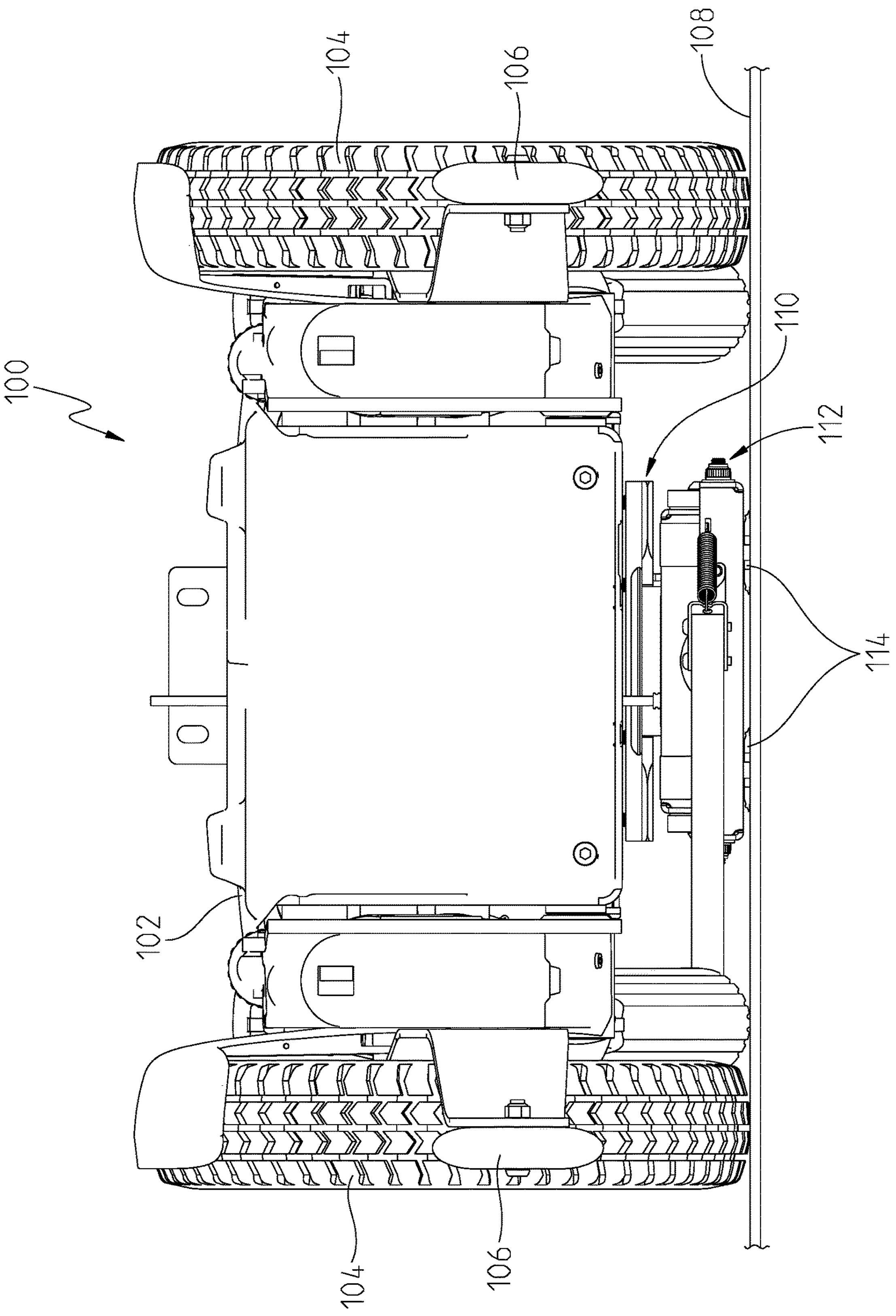
FIG. 1 is a front view of a powered wheelchair and docking system in a passenger vehicle.

Referring to FIG. 1 of the present disclosure, a wheelchair 100 is depicted. The wheelchair 100 may include a frame 102 supported by one or more wheels 104. A brake or anti-tilt/tip mechanism 106 may be located at one or more wheels 104 for slowing down or keeping the wheels 104 from turning, if necessary. The wheelchair 100 may be a powered wheelchair or a manually-operated wheelchair. Any type of wheelchair 100 is applicable to the present disclosure.

In FIG. 1, the wheelchair 100 is shown located in an interior of a vehicle which has a vehicle floor 108. The vehicle floor 108 may be the original OEM vehicle floor, or it may be a modified vehicle floor to accommodate a ramp or wheelchair lift assembly. In any event, the wheelchair 100 may be maneuvered such that the physically limited individual operating or positioned in the wheelchair may be positioned in any location of the vehicle, including at the driver's position of the vehicle.

In conventional vehicle arrangements, a physically limited individual may drive the vehicle so long as the wheelchair is properly latched or connected to the vehicle floor in at least one or two manners. Most conventional wheelchairs are attached to the vehicle via an attendant using four securement belts at each corner of the wheelchair. If the wheelchair user is independent and intends to drive or otherwise operate the vehicle, then most conventional wheelchairs require an aftermarket, conventional wheelchair docking system in which a bolt or other bolt-like feature connected to a bottom of the chair and protruding downward toward the floor. The bolt may then be received by a conventional docking system which is bolted through to the floor. The conventional docking system has a mechanism which receives and latches to the bolt, thereby holding the wheelchair to the vehicle floor. Additional mechanisms may be used to further support and fasten the wheelchair to the vehicle floor.

The conventional wheelchair, however, presents many problems. First, the bolt protrudes downwardly from the wheelchair and leaves very little clearance between the floor and the bolt. Thus, the bolt can often contact objects and the like that the wheelchair would otherwise clear. When the bolt does contact an object, it can cause the wheelchair to tip forward or rearward, or become obstructed with. Alternatively, the object may be dragged by the bolt until it can be cleared from underneath the wheelchair. In either case, it is disadvantageous to have a bolt protruding downwardly from the wheelchair and reducing the clearance between the wheelchair and floor.

In the present disclosure, an improved docking system 112 allows for the wheelchair 100 to have greater clearance between it and the floor 108. Moreover, the docking system 112 includes a first latching mechanism for coupling to a coupling device 110 on the wheelchair 100, and a second latching mechanism for coupling the wheelchair 100 to the vehicle floor 108 and preventing it from tilting to the left or right as the vehicle makes a turn. Thus, the present disclosure provides a better connection between the wheelchair 100 and the vehicle floor 108, and one which is safer over conventional docking systems. Further, the present disclosure provides a track system 114 which allows the docking system 112 to be adjusted longitudinally along the vehicle floor 108 for different sized passengers.

Figure 2:
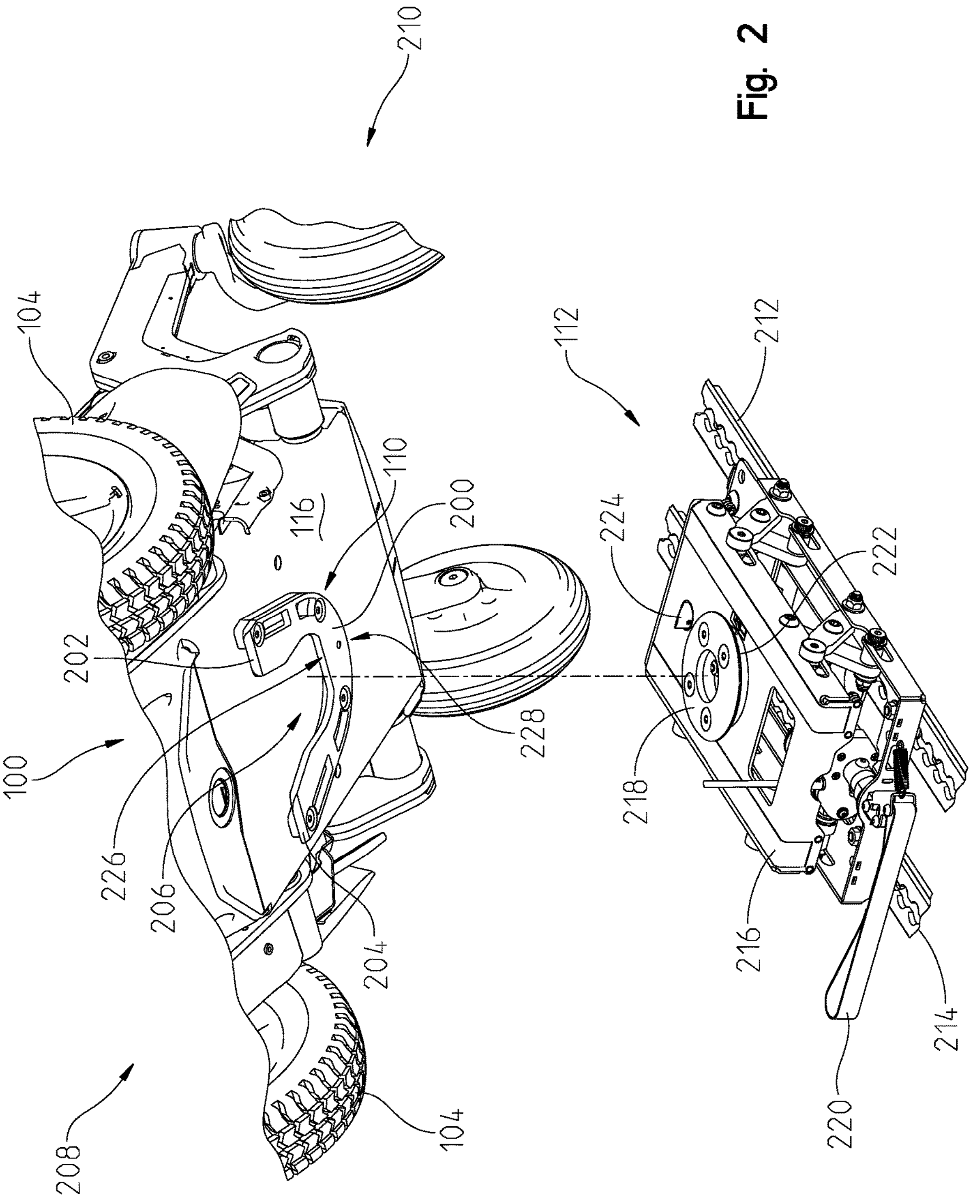
FIG. 2 is a partial exploded and perspective view of the wheelchair and docking system of FIG. 1.

In FIG. 2, for example, the bottom portion of the wheelchair 100 is better shown. Here, the wheelchair 100 has a bottom surface 116 to which the coupling device 110 is connected via one or more fasteners. The coupling device 110 may be a substantially U-shaped bracket 200 formed by a first leg 202 and a second leg 204. The first and second legs are spaced from one another to define an opening 206 therebetween. In FIG. 2, the opening 206 is oriented towards a front end 208 of the wheelchair 100 rather than a rear end 210.

Figure 4A:
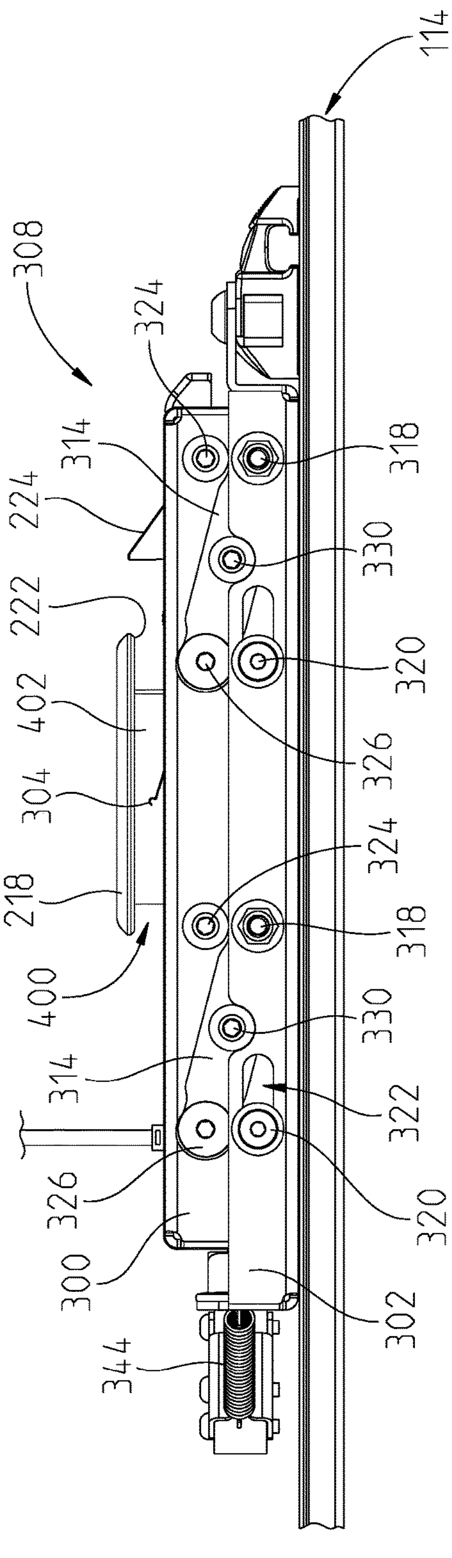
FIG. 4A is a side view of the wheelchair docking system in the first configuration of FIG. 3A.
Figure 4B:
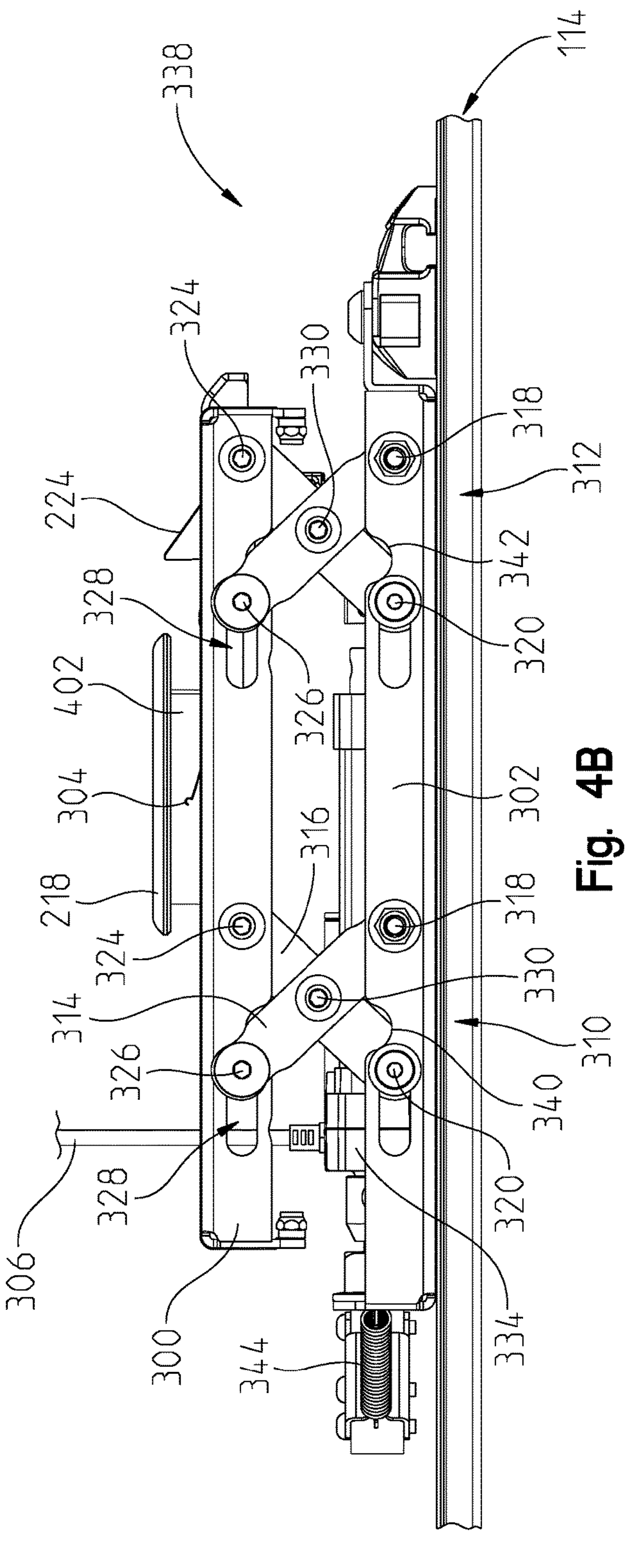
FIG. 4B is a side view of the wheelchair docking system in the second configuration of FIG. 3B.

The opening 206 in the bracket 200 is configured to engage with the docking system 112. The docking system 112 may include a frame 216 and a coupler mechanism 218 as shown in FIG. 2. The coupler mechanism 218 may comprise a neck portion 402 (FIG. 4) that extends upwardly from the frame 216 and terminates at a disk-shaped top portion 222. As the wheelchair 100 is moved into engagement with the docking system 112, the bracket 200 comes into contact with the coupler mechanism 218. In particular, the coupler mechanism 218 is received within the opening 206 of the coupling device 110, and the first leg 202 and second leg 204 are received within a space 400 (FIG. 4A-B) defined between the frame 216 of the docking system 112 and the disk-shaped top portion 222 of the coupler mechanism 218. In the engaged position, the first leg 202 and second leg 204 may be in close proximity or contact with the neck portion 402 of the coupler mechanism 218.

To maintain the wheelchair 100 engaged with the docking system 112, the docking system 112 may further include a retractable locking pin 224. The locking pin 224 may have an angled surface which comes into contact with a first surface 226 of the bracket 200 causing the locking pin 224 to be pushed downwardly into an opening. Once the bracket 200 clears the locking pin 224, a spring 512 (FIG. 5) may bias the locking pin 224 to its upward position of FIG. 2. In the upward position, the bracket 200 is retained between the coupler mechanism 218 and the locking pin 224. This connection between the wheelchair 100 and docking system 112 may establish a first of at least two latching mechanisms of the present disclosure.

The aforementioned track system 114 of the present disclosure is also shown in FIG. 2. Here, the track system 114 may include a first track 212 and a second track 214. The docking system 112 may be movably coupled to the first and second tracks, which is shown in greater detail in FIGS. 9 and 10. In these illustrated embodiments, a quick-connect track fitting such as an aluminum track fitting may be used for engaging with the tracks. Alternatively, a fastener such as a tee-bolt may be used for engaging the tracks.

The first and second tracks 212, 214 may be installed at the factory rather than as an after-market part. In doing so, the tracks can be strategically positioned and mounted to the vehicle floor without requiring any drilling through the vehicle floor during installation. As vehicle complexity continues to evolve, the area below the vehicle floor continues to be filled with electrical modules and harnesses, the fuel system, emissions control equipment, and batteries in the case of electric vehicles. As a result, any through-floor drilling runs the risk of damaging any of the systems located underneath the floor. Moreover, any new holes drilled through the vehicle floor can invite moisture and other contaminants into the cabin of the vehicle which can be undesirable for many reasons.

Further, as more electric vehicles become commercially available, battery packs and other electronic equipment may be located underneath the vehicle floor. Any through-floor drilling can damage or even destroy the batter pack or other equipment and create a safety hazard at the same time. Thus, for at least these reasons, it is undesirable to drill through the vehicle floor after the vehicle leaves the factory in order to install the tracks.

In the present disclosure, a method of installing the tracks and docking system in a vehicle includes mounting the tracks to the vehicle floor without requiring any through-floor drilling and/or bolting. The tracks may be mounted in any known way including welding, adhering or fastening. In some instances, the floor may be prepared with holes for assembling the track thereto before any control systems, electrical equipment, fuel lines, exhaust lines, etc. is mounted underneath the floor. In other instances, the tracks are mounting entirely within the cabin and directly to the vehicle floor surface.

Figure 9:
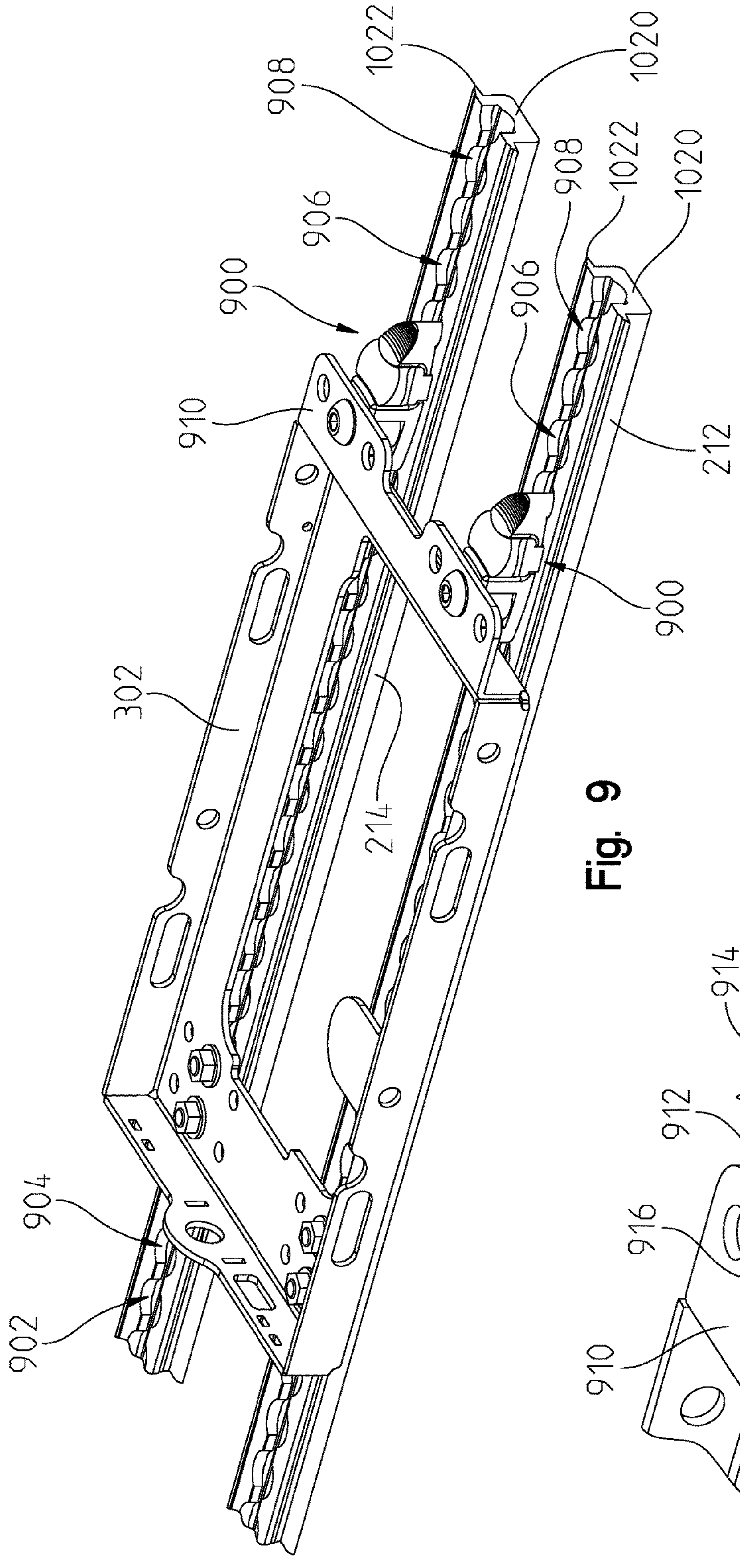
FIG. 9 is a partial perspective view of a portion of the wheelchair docking system and track system.

1$^{st}$ row, front (drivers & passengers), 2$^{nd}$ row center locations, 3$^{rd}$ row (in the case of Rear Entry or bus) installation In FIG. 9, for example, a lower portion 302 of the frame 216 of the docking system 112 is shown. Here, a flange 910 may protrude rearwardly from the lower portion 302 as shown. The docking system 112 spans a gap defined between the first track 212 and second track 214. In some instances, the gap therebetween may be different or adjustable depending upon the vehicle. Thus, to accommodate different gaps between the first and second tracks, the flange 910 may include a plurality of openings 1004 (FIG. 10) to adjustably couple the docking system 112 to the track system 114.

The docking system 112 may include a bottom plate or panel 1006 which define a plurality of openings 1008 therein as well. The plurality of openings 1008 are also to accommodate different gaps between the first and second tracks.

Figure 10:
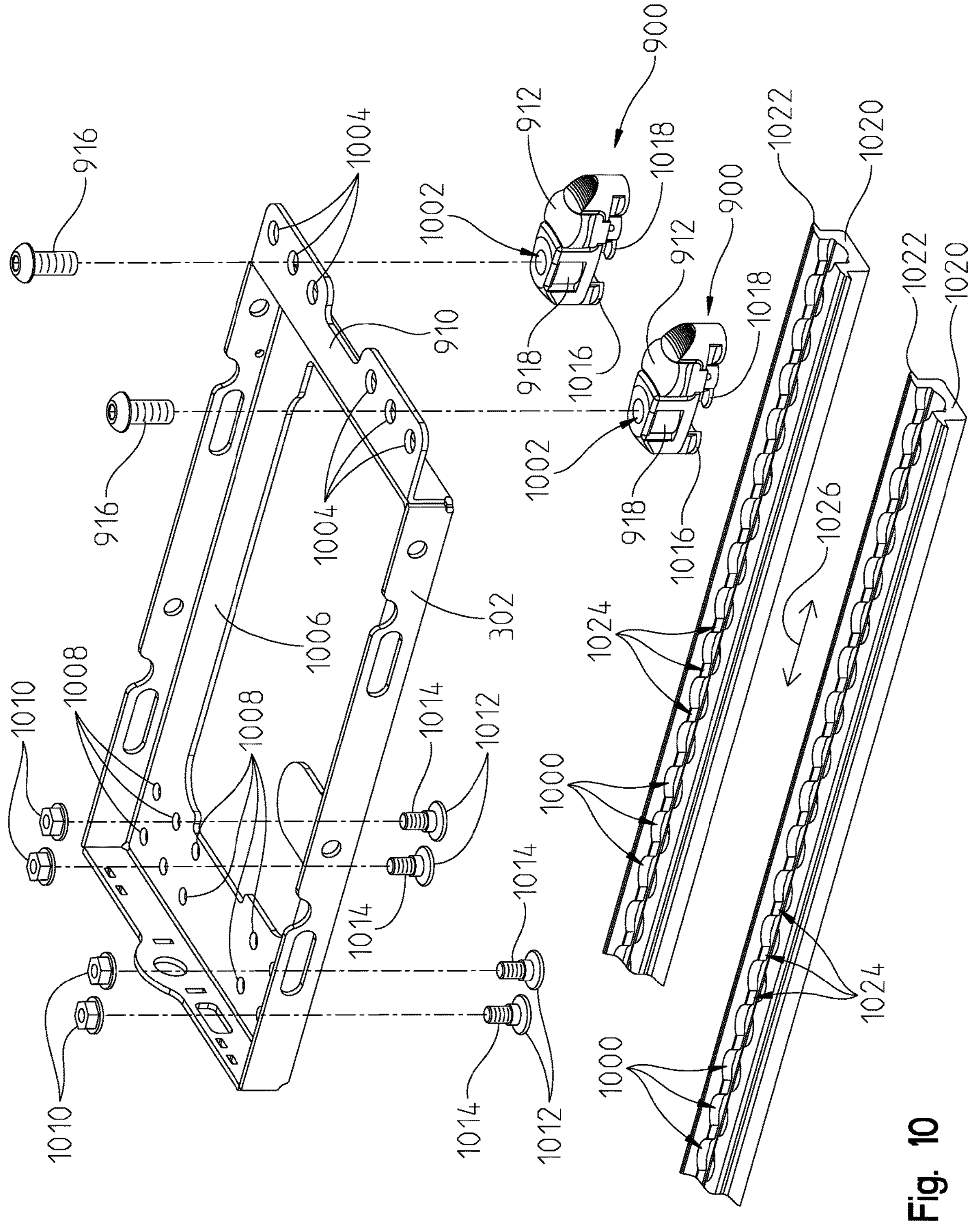
FIG. 10 is a partial exploded perspective view of the portion of the wheelchair docking system and track system of FIG. 9A.

Each of the tracks may include a body that has a bottom portion 1020 and a top portion 1022. The top portion 1022 may have an outer lip that extends outwardly on both sides, as shown in FIG. 10. Moreover, each track defines a plurality of receptacles 1000 configured to receive the docking system 112. In FIG. 9, for example, the plurality of receptacles 1000 may include a first receptacle 902, a second receptacle 904, a third receptacle 906, a fourth receptacle 908, and so forth. Each of the plurality of receptacles 1000 is equally spaced from an adjacent receptacle along each longitudinal track. Further, a narrower channel 1024 connects each adjacent receptacle to another receptacle, as shown in FIG. 10. The channel 1024 may extend from a first end of each track 212, 214 to an opposite end thereof.

Figure 9A:
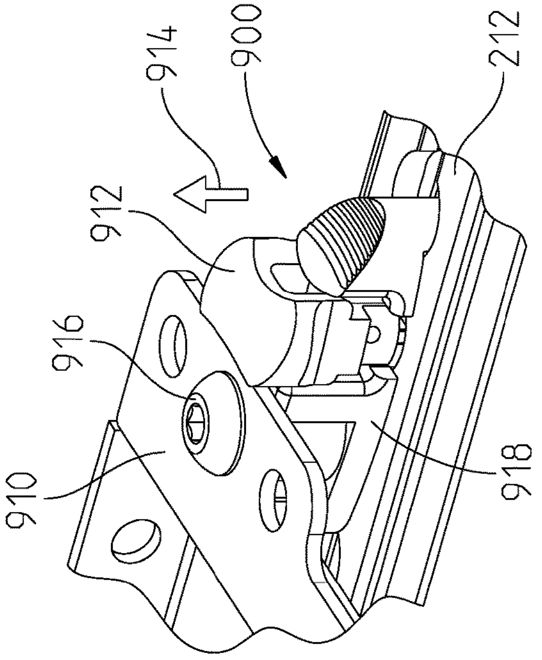
FIG. 9A is a partial perspective view of a release mechanism for adjusting the wheelchair docking system relative to the track system.

The docking system 112 may be movably coupled to the track system 114 via an adjustable latch 900. In FIGS. 9 and 9A, the adjustable latch 900 may include a body 918 that defines an opening 1002 for receiving a fastener 916. In FIG. 10, the fastener 916 may fit through one of the plurality of openings 1004 in the flange 910 and further coupled to the body 918. For instance, the body 918 may include internal threads to which the fastener 916 may be coupled. The fastener 916 may couple to the body 918 in any conventional manner.

The adjustable latch 900 may include a tab portion 912 which may be slidable in an upward direction 914 as shown in FIG. 9A. As the tab portion 912 is moved in the upward direction 914, it may be released from being disposed in one of the plurality of receptacles 1000. As a result, the adjustable latch 900 can be used to move the docking system 112 in a longitudinal direction 1026 relative to the track system 114. Moreover, as the docking system 112 is moved, a first post 1016 and a second post 1018 on each adjustable latch 900 may slide through the narrow channel 1024 until the tab 912 is repositioned in a different receptacle.

The adjustable latch 900 may be located on the rear of the docking system 112. At the front of the docking system, a pair of retaining pins may be engaged with the first track 212 and second track 214. Each retaining pin may include a neck portion 1014 and a retaining end 1012. A nut 1010 or other fastener may be threadedly coupled to the neck portion 1014 of each retaining pin. Thus, the retaining pin is coupled to the bottom panel 1006 of the docking system. The retaining pin, unlike the adjustable latch 900, remains coupled to the docking system and may slide in the longitudinal direction 1026 through the channel 1024 as the docking system 112 is adjusted. Specifically, the neck portion is aligned within the channel 1024 whereas the retaining end is disposed within one the receptacles. The retaining end is permitted to move within the channel 1024 when the docking system 112 is adjusted longitudinally relative to the first and second tracks.

The openings 1004 in the flange 910 and the openings 1008 in the bottom plate 1006 allow for the docking system 112 to be adjusted side-to-side or perpendicular to the longitudinal direction 1026. As shown in FIG. 10, the adjustable latches 900 may be positioned in any one of three of the openings 1004 in the flange 910 and the necks 1014 may be positioned in any one of three openings in the bottom plate 1006. While in the illustrated embodiment there are three openings 1004, 1008, in other embodiments there may be two or more openings, i.e., two openings, four openings, five openings, six openings, etc. The side-to-side or lateral adjustability, as well as the fore-and-aft adjustability, can allow a wheelchaired passenger to use the docking system as either a driver or passenger.

Figure 3A:
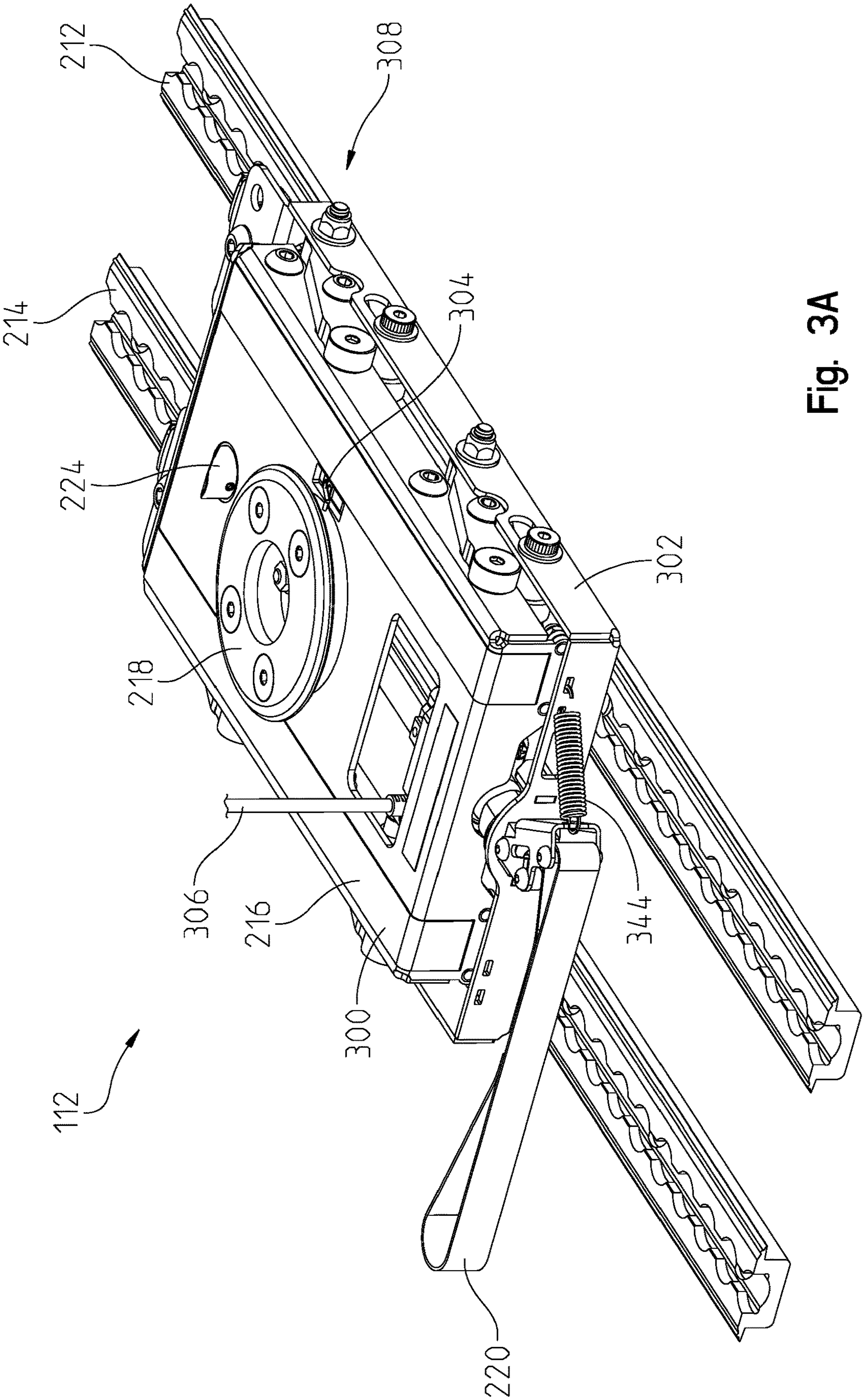
FIG. 3A is a perspective view of a wheelchair docking system and track system for a passenger vehicle in a first configuration.

Referring now to FIG. 3A, the docking system 112 is shown coupled to the track system 114. The docking system 112 may include a top portion 300 and a bottom portion 302. The bottom portion 302 has been described with respect to FIGS. 9-10 above and include the bottom panel 1006 and flange 910. The top portion 300 forms part of the frame 216 to which the coupler mechanism 218 and locking pin 224 are connected. In FIG. 3A, the docking system 112 is shown in its lowered position 308, whereas in FIG. 3B the docking system 112 is in its raised position 338. The docking system 112 is in its raised position 338 when it is not engaged with the wheelchair 100.

The docking system 112 includes a switch 304 for detecting the presence of the bracket 200 and wheelchair 100. A wire or other means may electrically couple the switch 304 to a controller 1102 (FIG. 11) for communicating with the driver or physically limited individual that the bracket 200 is coupled to the docking system 112. For instance, the controller 1102 or a control system 1100 may receive a signal from the switch 304 and display a signal or illuminate a light on a dashboard 1112 of the vehicle indicating the connection.

Figure 3B:
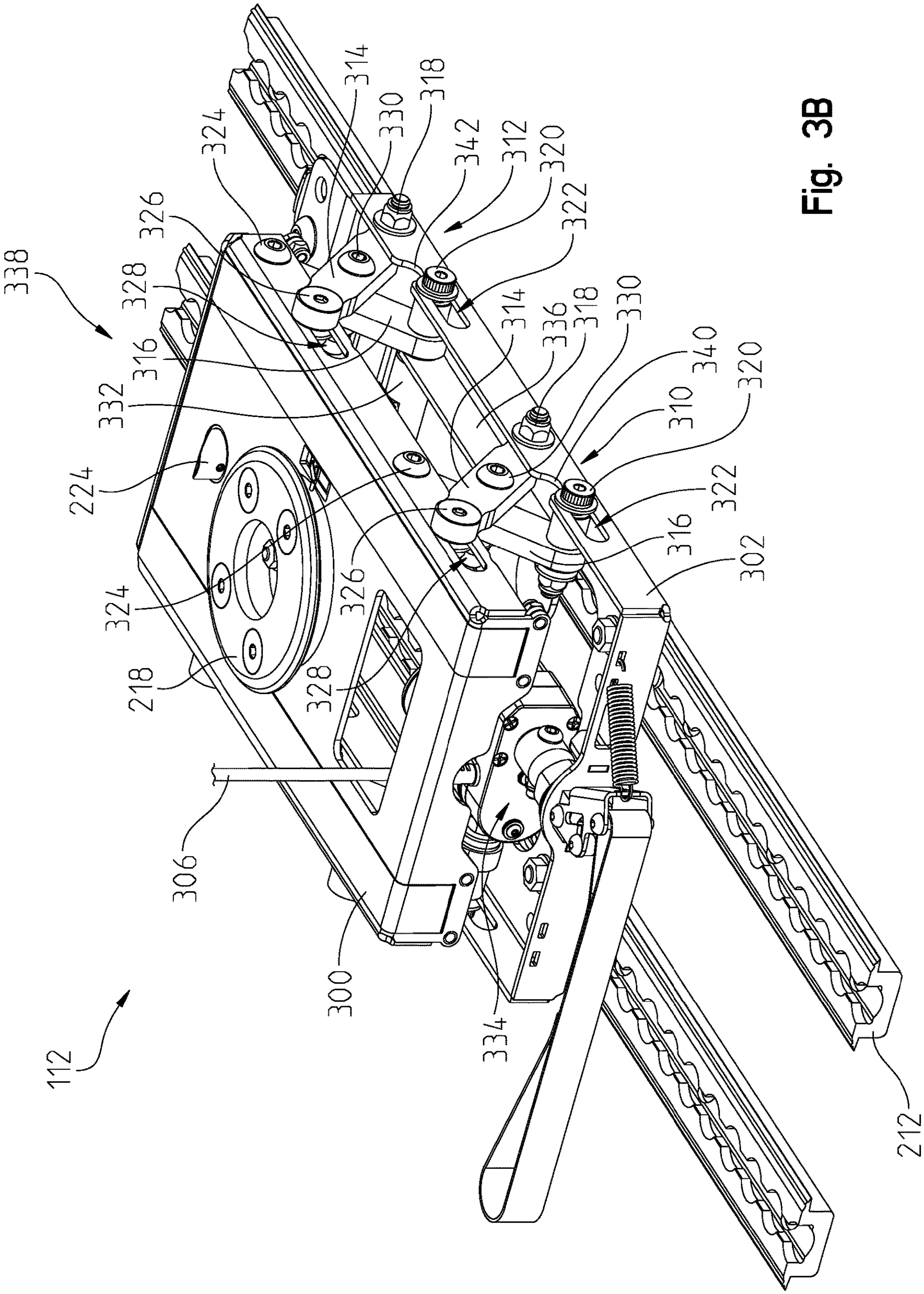
FIG. 3B is a perspective view of a wheelchair docking system and track system for a passenger vehicle in a second configuration.

A second wire or cable 306 is shown in FIG. 3A. This wire or cable 306 may be coupled to a first actuator 334 as shown in FIG. 3B. A control button 1108 located in the vehicle may be electrically coupled to the actuator 334 via the wire or cable 306. Alternatively, the controller 1102 or control system 1100 may automatically communicate with the actuator 334 to trigger it between an extended and retracted position. The actuator 334 forms part of the second latching mechanism of the present disclosure.

When the sensor 304 detects that the wheelchair is engaged by the coupler mechanism 218 and locking pin 224, it may send a signal to a controller 1102 to automatically trigger the actuator 334. Alternatively, the signal may be displayed on a dashboard 1112 or display screen 1110 in the cab of the vehicle, and the operator may manually trigger the actuator 334. As the actuator 334 extends and retracts, the top portion 300 may move upwards or downwards relative to the lower or bottom portion 302. In other words, the actuator 334 may control the movement of the docking system 112 between its raised position 338 of FIG. 3B and its lowered position 308 of FIG. 3A.

The manner in which the docking system 112 moves between its raised and lowered positions will now be described. The docking system 112 may include a front scissor assembly 310 on a front end thereof and a rear scissor assembly 312 on a rear side thereof. Moreover, there may be a front scissor assembly 310 and rear scissor assembly 312 on both the left and right sides of the docking system 112. The front scissor assembly 310 and rear scissor assembly 312 may include a pair of legs. For example, each assembly may include a first leg 314 and a second leg 316. The first leg 314 may be disposed outwardly of the second leg 316. Moreover, the first leg 314 may be coupled to an outside location of the top portion 300 of the docking system 112 and an inside location of the bottom portion 302. The second leg 316 may be coupled at an inside location of the top and bottom portions of the docking system 112, as shown in FIG. 3B.

The first leg 314 and second leg 316 may be coupled at an approximate midpoint along the length of each leg. In FIG. 3B, for example, the first leg 314 and second leg 316 may be pivotally coupled via a connection pin 330 or fastener. The first leg 314 and second leg 316 can therefore pivot relative to one another about an axis defined by the connection pin 330. This is the only coupling point between the first and second legs.

The first leg 314 may be fixedly coupled at one end thereof to the bottom portion 302 of the docking system 112 via a fastener 318. Thus, the first leg 314 cannot move laterally relative to the bottom portion 302 at this location. At an opposite end, the first leg 314 may be movably coupled to the top portion 300 via a pin 326. Here, the pin 326 can move within a longitudinal slot 328 defined in the top portion 300 of the docking system 112. Thus, as the actuator 334 extends and retracts, the first leg 314 remains fixed at one end to the bottom portion 302 via the fastener 318 but moves longitudinally in the slot 328 at an opposite end thereof.

Similarly, the second leg 316 includes two ends. At a first end, the second leg 316 is fixedly coupled to the top portion 300 via a fastener 326. At an opposite second end, the second leg 316 is movably coupled to the bottom portion 302 via a pin 320. The pin 320 is able to move longitudinally within a longitudinal slot 322 defined in the bottom portion 302.

The above-described first and second legs of the front scissor assembly 310 is equally applicable to the front scissor assembly 310 on the opposite side of the docking system 112 as shown in FIG. 3B. Moreover, the rear scissor assembly 312 functions in the same manner. Thus, for sake of brevity, the manner in which the rear scissor assembly 312 operates will not be described.

Figure 5A:
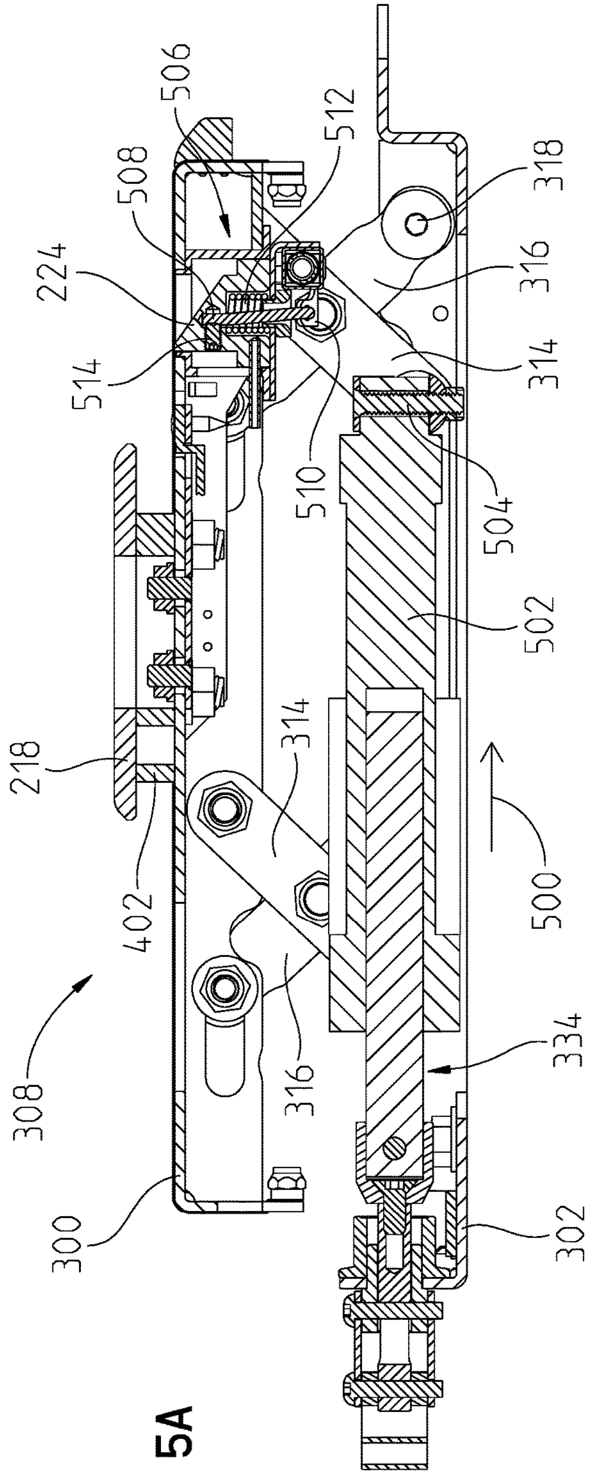
FIG. 5A is a side cross-sectional view of the wheelchair docking system in the second configuration.
Figure 7:
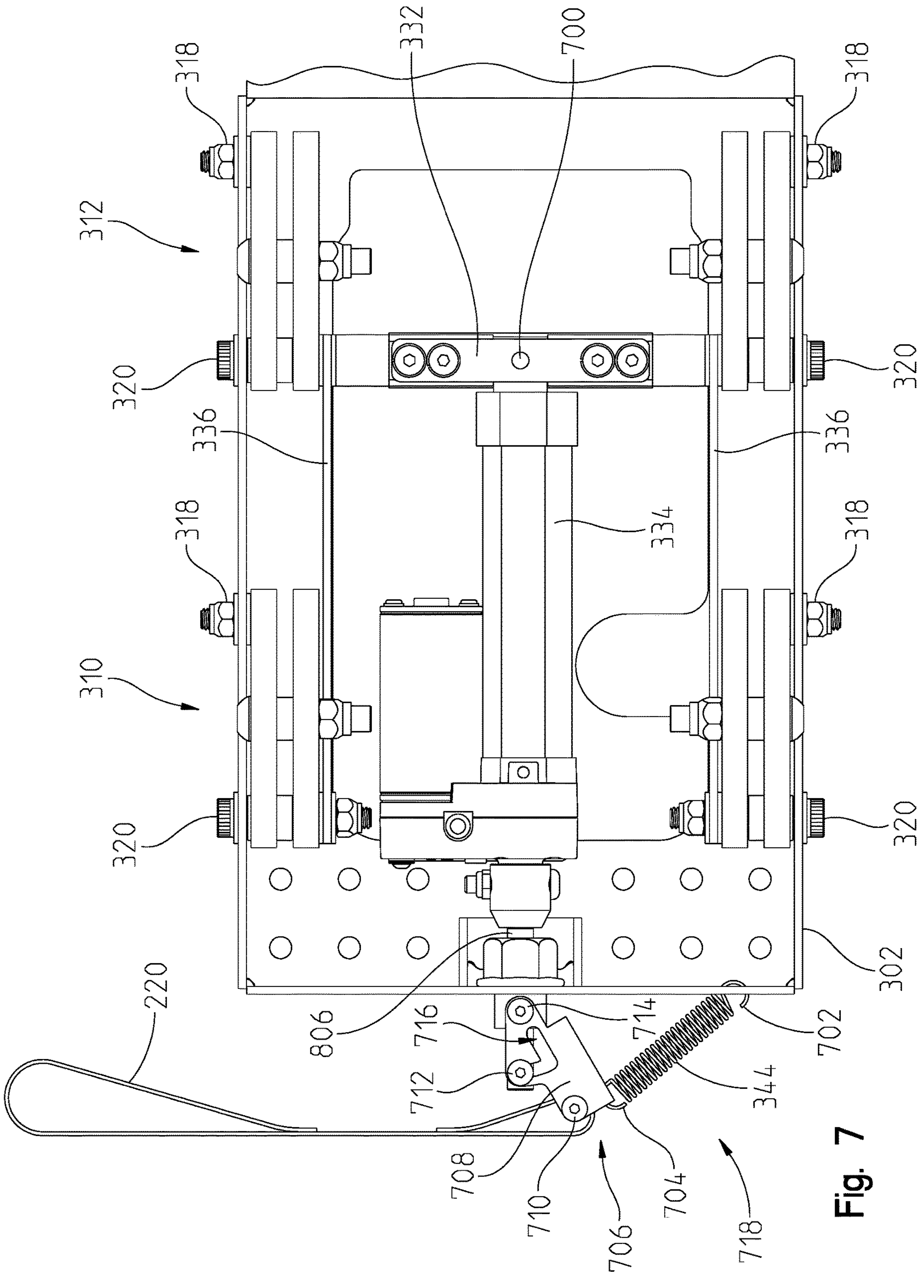
FIG. 7 is a bottom view of the wheelchair docking system.

The rear scissor assembly 312 is also coupled to a cross member 332 as shown in FIG. 3B. In particular, the cross member 332 extends the width of the docking system 112 and is coupled to the pins 320 and second leg 316. Moreover, the cross member 332 may be coupled to the actuator 334 via a connector 700 (FIG. 7). In FIG. 5A, for example, the connector 700 is shown as a bolt 504 that couples a rod 502 of the actuator 334 to the cross member 332. As the actuator 334 extends and retracts, the cross member 332 may move longitudinally. Since the cross member 332 is coupled to the second legs 316, movement of the cross member 332 in a longitudinal direction 500 (FIG. 5) via the actuator 334 may in turn induce the second legs 316 to move longitudinally within the longitudinal slots 322.

The second leg 316 of the rear scissor assembly 312 may be coupled to the second leg 316 of the front scissor assembly 310 via a longitudinal member 336. Thus, longitudinal movement of the second leg 316 of the rear scissor assembly 312 is in turn translated into longitudinal movement in the same direction of the second leg 316 of the front scissor assembly 310. As a result, the docking system 112 is capable of moving between its raised position 338 and lowered position 308 via actuation of the first actuator 334.

The bottom portion 302 of the docking system 112 may include a first recess 340 and a second recess 342 for receiving the connection pin 330 of the front and rear scissor assemblies in the lowered position 308.

Once the docking system 112 is in its lowered position 308, it is better able to maintain the wheelchair 100 from rocking or tilting as the vehicle is making a turn. The locking pin 224 provides a first latching mechanism to connect the wheelchair 100 to the docking system 112, and the actuation of the docking system 112 to its lowered position functions as a second latching mechanism for holding the wheelchair 100 more securely during vehicle operation.

While the first and second latching mechanisms are able to securely couple the wheelchair 100 to the vehicle floor 108, there may be an instance where it is desirable to manually release the latching mechanisms. For example, if the vehicle is involved in an accident or there is an emergency, it may be necessary to unlatch the chair from the floor. Alternatively, if the vehicle loses electrical power, it may be necessary to manually release the wheelchair from the docking system 112. To do so, there are two release systems in place for this.

Figure 5B:
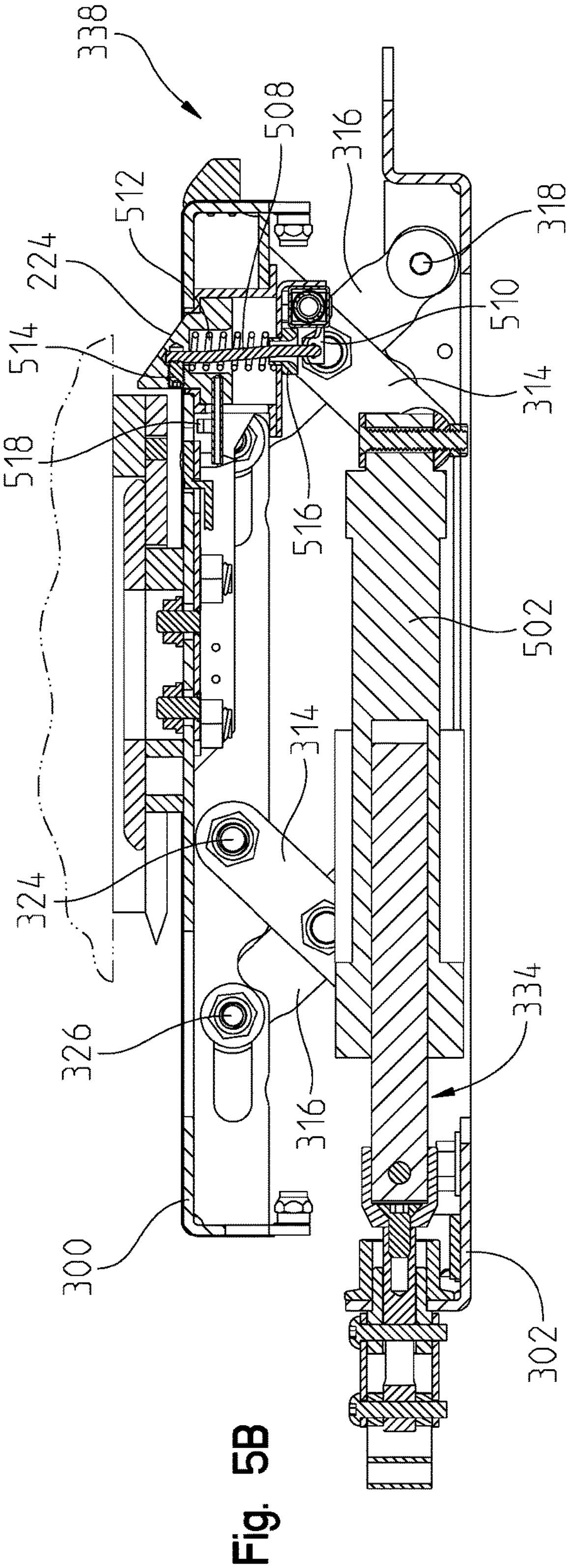
FIG. 5B is another side cross-sectional view of the wheelchair docking system in the second configuration.
Figure 6:
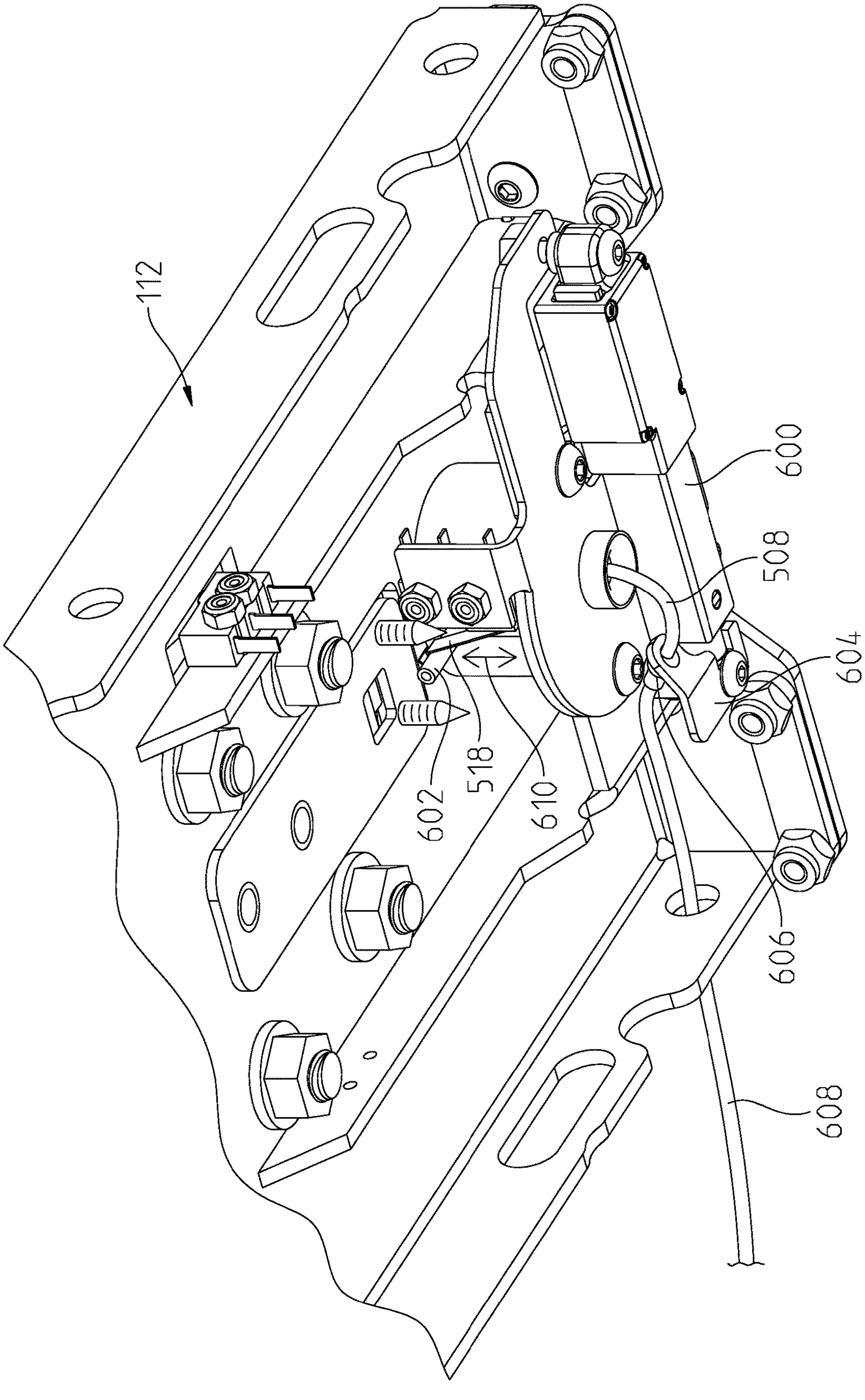
FIG. 6 is a partial bottom perspective view of the wheelchair docking system.

In FIGS. 5A, 5B, and 6, for example, a first of the release systems is depicted. Here, a first release mechanism 506 is shown for releasing the locking pin 224 and allowing the wheelchair to move away from the docking system 112. Before describing this release mechanism 506, however, it is necessary to point out that in FIG. 6 that a second actuator 600 is provided for moving the locking pin 224 between its upward and downward positions. The second actuator 600 may be controlled by a controller 1102 such as the vehicle controller 1114 or any other controller. In one example, a controller 1102 for only controlling the docking system 112 may be provided. In this instance, the controller 1102 may be in communication with the vehicle controller 1114 and/or any other controller of the vehicle (e.g., transmission controller 1118, engine controller 1116, etc.) over a communication link such as CAN, J-1939, etc.

The second actuator 600 may be coupled to a plate 604 as shown in FIG. 6. As the actuator 600 is actuated between an extended and retracted position, it induces movement of the plate 604. As the plate 604 is moved, it is coupled to the locking pin 224 via a pin 602 to move it in a downward position to compress a spring 512. The actuator 600 may provide sufficient force to the plate 604 to compress the spring 512 and move the locking pin to a retracted position such as shown in FIG. 5A. As the actuator 600 returns to a normal position, the spring 512 may bias the locking pin 224 to its upright position of FIG. 5B. Thus, control of the second actuator 600 allows for releasing the locking pin 224 when desired. Moreover, the locking pin 224 and pin 602 may move in a direction indicated by arrow 610 in FIG. 6.

In some instances, a button or other control 1108 may be in the vehicle to allow the wheelchaired passenger or other individual to control the actuator 600. The button or control 1108 may be manually triggered, which sends a signal to a controller 1102 which in turn commands the actuator 600 to actuate between its extended and retracted positions. As described above, an alternative embodiment would be for the controller 1102 to automatically detect a condition to release the locking pin 224. The controller 1102 may include logic, software, or an algorithm to operate from for actuating the first and second actuators of the present disclosure.

The first release mechanism 506 may include a cable or cord 608 of which a user may pull to retract the locking pin 224 from its latched position of FIG. 5B. The cable or cord 608 may be coupled to a cable 508 as shown in FIG. 5A, and one end of the cable 508 may be coupled to the locking pin 224 via a set screw 514 or other fastener. Thus, movement of the cable 508 induces the locking pin 224 to move downward and compress the spring 512.

The cable 508 passes through a ferrule 516 as shown in FIG. 5B. A bracket 510 is further coupled to the cable 508. The bracket 510 may be similar to or the same as the plate 604. A ball 606 or other feature may be coupled to the cord 608 and rests against the plate 604 as shown in FIG. 6. As a user pulls on the cord 608, it in turn pulls the cable 508 and locking pin 224 downwardly until the locking pin 224 is in the position shown in FIG. 5A.

A sensor 518 may be provided for detecting a position of the locking pin 224 and communicate this to a controller 1102 or display the position on a dashboard 1112 or other display 1110 in the vehicle. Thus, the operator and/or wheelchaired passenger will know the position of the locking pin 224 based on the detection made by the sensor 518.

Figure 8:
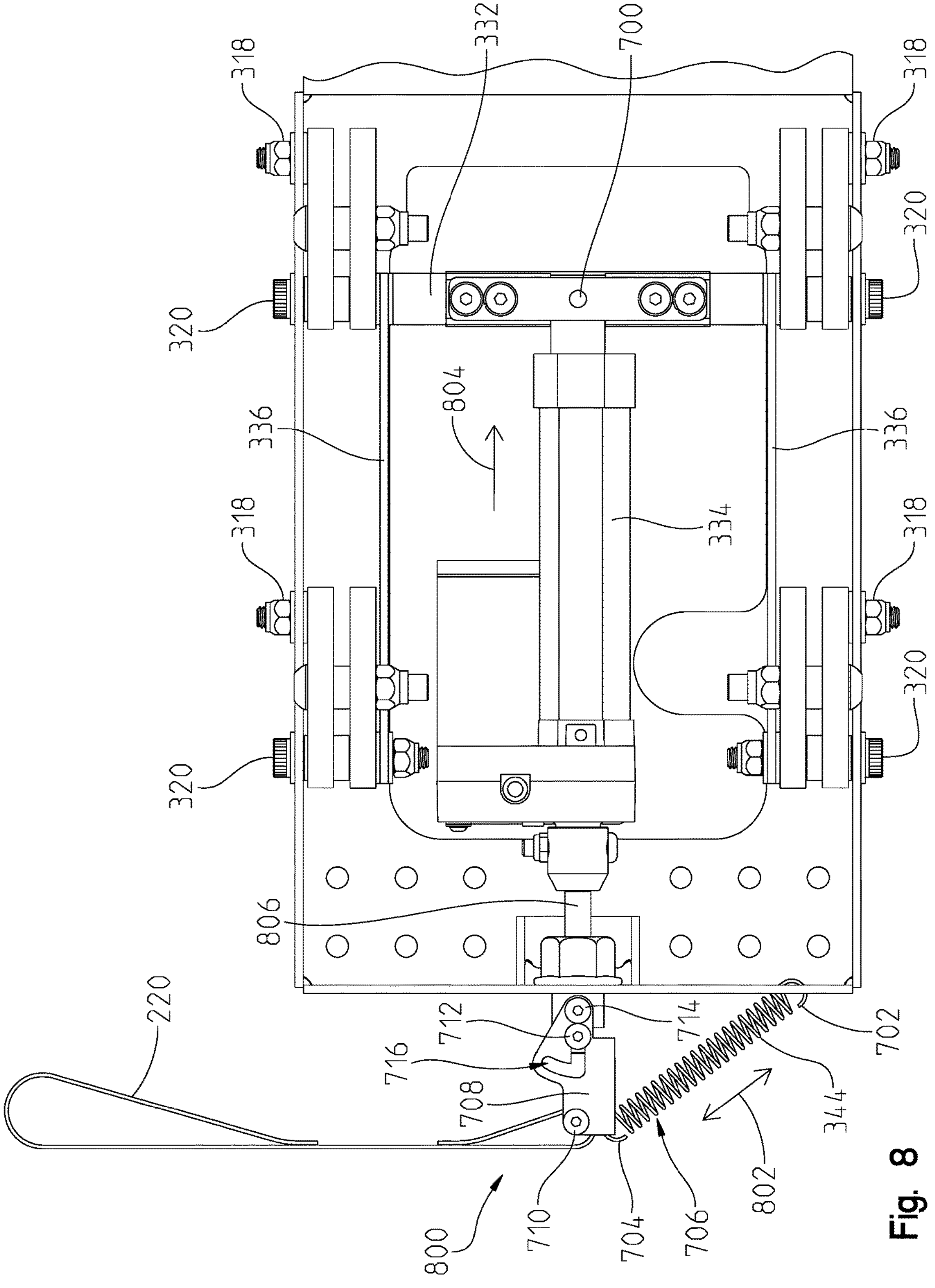
FIG. 8 is another bottom view of the wheelchair docking system.

The release mechanism 506 is useful to release the locking pin 224 and allow the wheelchair to be disengaged from the docking system 112. In FIGS. 7 and 8, a second release mechanism 706 is shown for raising the docking system 112 from its lowered position 308 to its raised position 338. Here, the second release mechanism 706 may include a safety strap or cable 220 that is coupled to a plate 708 via a fastener 710.

A spring 344 may be coupled between the plate 708 and the bottom portion 302 of the docking system 112. In particular, the spring 344 may include a first hook end 702 coupled to the bottom portion 302 and a second hook end 704 coupled to the plate 708.

The plate 708 may further be coupled to the docking system 112 via a first connector 714. In addition, the plate 708 may include an L-shaped slot 716 defined therein. A pin 712 may slide or otherwise move within the slot 716. The pin 712 may be coupled to a rod 806 of the first actuator 334 as shown in FIGS. 7 and 8. As the pin 712 moves within the slot 716, the rod 806 may extend or retract.

For example, in FIG. 7, the docking system 112 may be in its lowered position 308. The spring 344 is in its free, extended or uncompressed position 718. The pin 712 is located at a first end of the slot 716 and the actuator rod 806 is in its retracted position. In FIG. 8, however, the strap or cable 220 may be pulled to achieve a release configuration 800 thereby causing the pin 712 to move within the slot 716 to an opposite end thereof. As it does, the spring 344 is extended along direction 802. Moreover, as the pin 712 moves to the opposite end of the slot 716, the pin 712 induces the rod 806 to extend along direction 804 in FIG. 8. In doing so, the first and second scissor assemblies may raise the docking system 112 an amount equivalent to the length of the slot to relieve down pressure. Thus, in one example, the second release mechanism 706 is capable of transferring the docking system 112 from its lowered position 308 to its raised position 338. Stated another way, a clamping force on the docking system 112 is in effect relieved. In combination with the first release mechanism 506, the wheelchair 100 may be manually disengaged and released from the docking system 112 as necessary.

Figure 11:
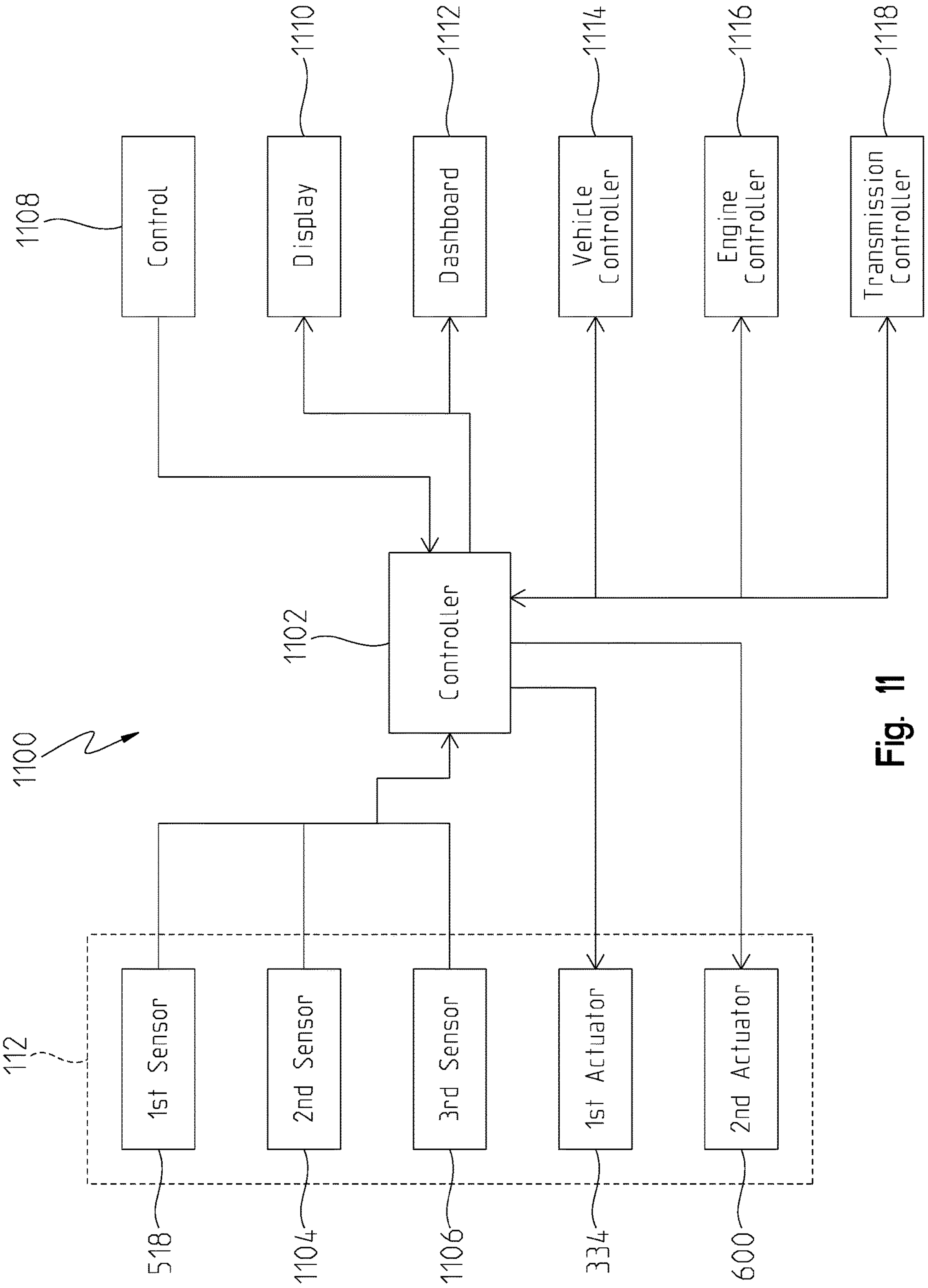
FIG. 11 is a diagram of a control system for controlling the docking system.

Referring to FIG. 11, which has been intermittently alluded to in the above description, a control system 1100 for controlling the docking system 112 and the interaction between the docking system 112 and the wheelchair 100 is provided. The control system 1100 may include a controller 1102 which includes a memory unit and processor. The memory is capable of storing logic, algorithms, software, etc. for performing one or more tasks. The memory may further store information, collect data, and receive information from other controllers such as a vehicle controller 1114, engine controller 1116, and transmission controller 1118. The processor or processing unit may be capable of executing the logic, algorithms, software, etc.

In one embodiment, the controller 1102 is a stand-alone controller for controlling the docking system 112. In another embodiment, the controller 1102 may be the vehicle controller 1114, the engine controller 1116, the transmission controller 1118, or any other controller found on a vehicle. Moreover, the controller 1102 may be remotely located from the vehicle and communicate with the docking system over a wireless communication network such as Wi-Fi.

The controller 1102 may be in communication with a user control 1108 which may be located in the vehicle. Alternatively, the user control 1108 may be remote from the vehicle. In any event, a user such as the wheelchaired passenger or vehicle operator may send instructions to the controller 1102 by actuating the user control 1108.

In turn, the controller 1102 may communicate with the user by displaying a signal, data, information, instructions, etc. via a display 1110 or dashboard 1112. The display 1110 or dashboard 1112 may be located in the vehicle. The display 1110 may be a computer display. The signal may be communicated by illuminating a light in the vehicle to alert the user that the docking station 112 is engaged with the wheelchair 110 or vice versa. Other types of signals are also possible.

The controller 1102 may be in communication with the first actuator 334 and second actuator 600 of the docking system 112. In this manner, the controller 1102 may command either or both actuators to extend or retract. This may be based on a user command via the user control 1108, or it may be part of the control logic, algorithms, software, etc. executed by the processor of the controller 1102.

The controller 1102 may receive signals from one or more sensors. For example, the sensor 518 may detect the position of the locking pin 224 and communicate this position to the controller 1102. A second sensor 1104 may detect a position of the first actuator 334 and/or second actuator 600. For example, the controller 1102 may command the actuator 334 to extend by a desired amount. The second sensor 1104 may detect how much the actuator 334 has extended and communicate the same to the controller 1102. In this way, the controller 1102 receives feedback from the sensor 1104 and can further adjust its commands to either actuator.

The control system 1100 may include a third sensor 1106 which may be positioned on the docking system 112 and is able to detect an oncoming wheelchair 100. The third sensor 1106 may be a proximity sensor, Hall Effect sensor, or any other type of sensor. The third sensor 1106 may detect a height or clearance between a bracket 200 on the approaching wheelchair 100 and communicate the same to the controller 1102. In turn, the controller 1102 may actuate the first actuator to cause the docking system 112 to move upwards or downwards based on the detected clearance by the third sensor 1106. In doing so, the second sensor 1104 can detect how far and in what direction the actuator 334 moves in order to determine if the actuator 334 responded correctly based on the instruction from the controller 1102. A fourth sensor (not shown) may detect the height of the coupler mechanism 218 relative to the vehicle floor 108 and communicate the same to the controller 1102. Thus, the controller 1102 is able to receive signals indicative of an approaching wheelchair 100, the desired height of the docking system 112 for receiving the wheelchair 100, the actual height of the docking system 112, and the responsiveness of the first actuator 334 for adjusting the height of the docking system 112.

Additional control logic or algorithms may be performed by the control system 1100 for docking the wheelchair 100 to the docking system 112. One or more controllers may execute the control logic or algorithms. In a further embodiment, the wheelchair may include a controller or transmitter for communicating with the control system 1100. In this manner, the transmitter or controller on the wheelchair may alert the controller 1102 or third sensor 1106 of its approach.

Figure 12:
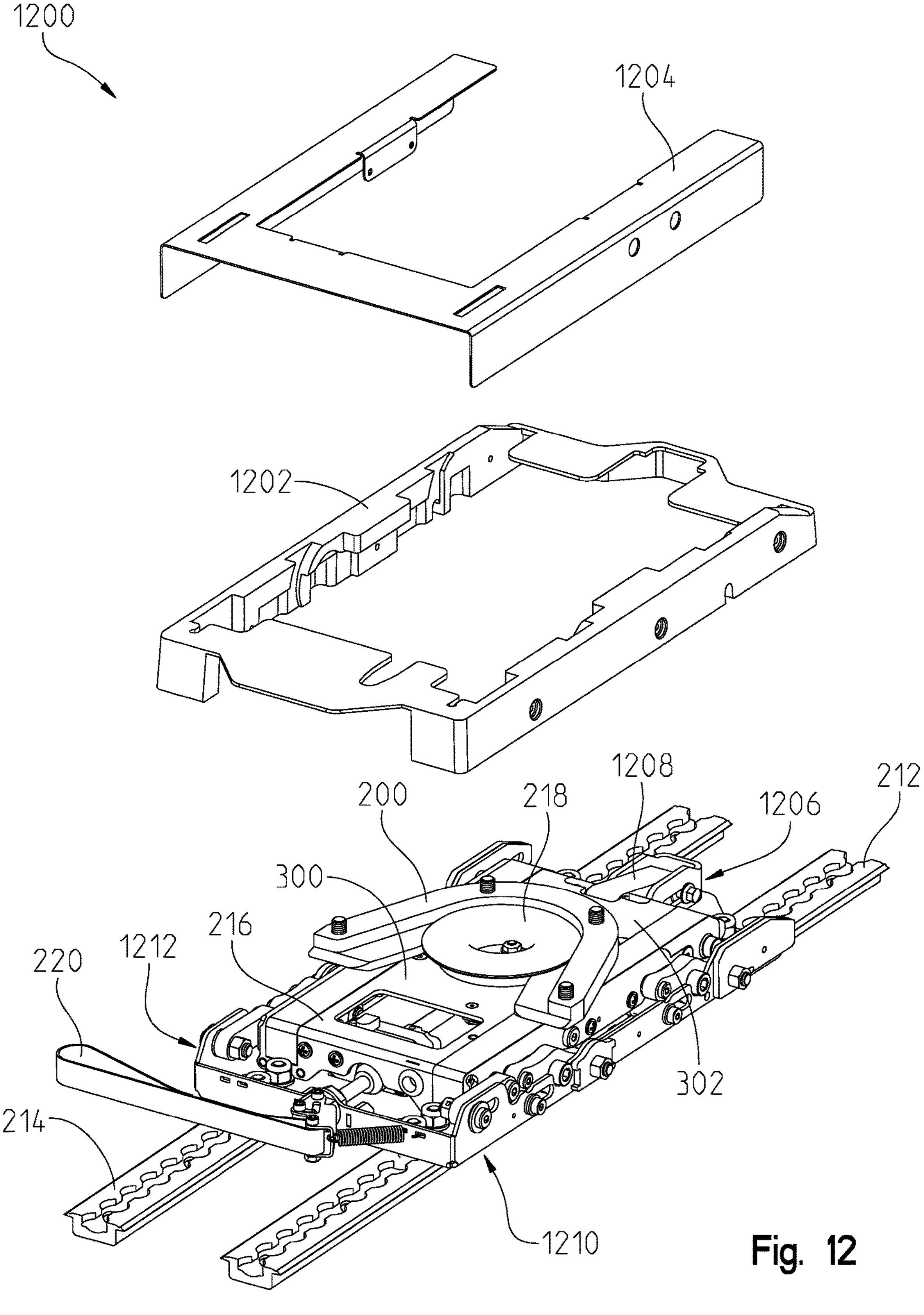
FIG. 12 is a partial exploded and perspective view of another embodiment of a wheelchair docking system.
Figure 13:
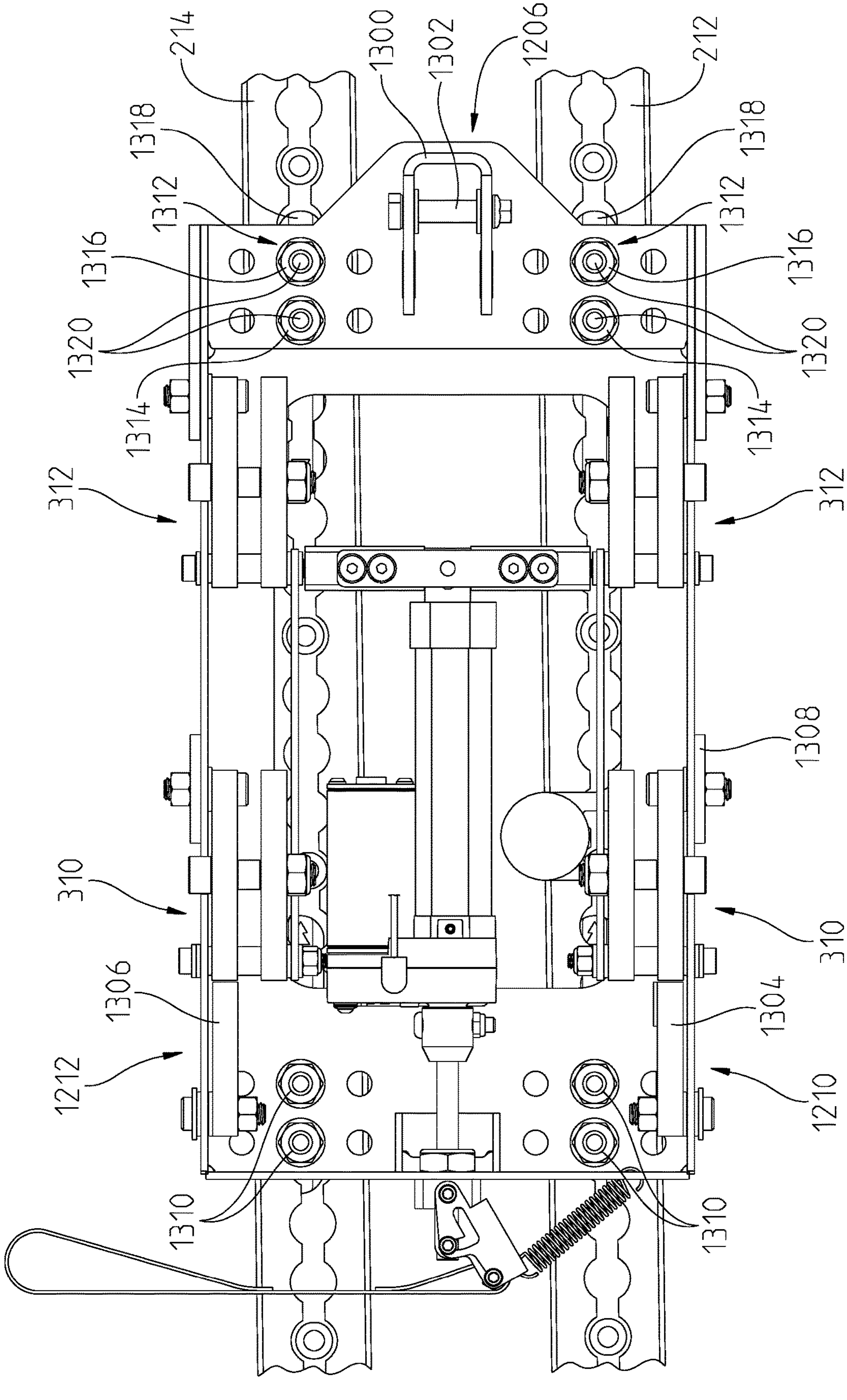
FIG. 13 is a top view of the wheelchair docking system of FIG. 12 with a top portion thereof removed.

Referring now to FIGS. 12 and 13, a different embodiment of a wheelchair docking system 1200 is illustrated. For sake of brevity, features in the embodiment of FIGS. 12 and 13 that remain unchanged from the embodiments in FIGS. 1-11 include the same reference number. For this reason, only the features that have changed between embodiments will be addressed.

In FIG. 12, the wheelchair docking system 1200 may include a lower protective shroud 1202 and an upper protective shroud 1204. The lower protective shroud 1202 may be formed of a plastic material formed by any known process such as injection molding. The upper protective shroud 1204 may be formed of sheet metal or similar material. The pair of shrouds provide additional safety and aesthetic benefits to the wheelchair docking system 1200.

The docking system 1200 may also include a plurality of tether assemblies for increased structural integrity and improvement. For instance, a rear tether assembly 1206 is depicted in FIGS. 12 and 13 having a rear load tether strap 1208. The rear load tether strap 1208 may be coupled at one end to a pin 1302 which is affixed to a mounting bracket 1300. The mounting bracket 1300 may be welded or otherwise coupled to the lower portion 302 of the system 1200.

In at least one embodiment, the pin 1302 may pivot or rotate about an axis within the bracket 1300.

The rear load tether strap 1208 may be coupled at its opposite end to the top portion 300 of the system. The rear tether assembly 1206 may be approximately centrally located as shown in FIGS. 12 and 13. Moreover, the top portion 300 may be a cast material for improved structural integrity.

The wheelchair docking system 1200 may also include a pair of front tether assemblies. A first front tether assembly 1210 may be located at a first front corner and a second front tether assembly 1212 may be located at a second front corner. Each tether assembly may include a tether strap similar to that of the rear tether assembly 1206. For instance, the first front tether assembly 1210 may include a tether strap 1304 and the second front tether assembly 1212 may include a tether strap 1306. Each tether strap 1304, 1306 may be coupled at one end to the lower portion 302 and at the opposite end to the top portion 302.

The docking system 1200 may also include an upper and lower gussets. The lower gusset 1308 is located at the front scissor assembly 310. The upper gusset, which is not shown in FIGS. 12 and 13, is also located at the front scissor assembly 310. Each gusset may be welded to the system. In particular, the lower gusset 1308 may be welded to the lower portion 302, whereas the upper gusset may be welded to the top portion 300.

As also shown in FIG. 13, a plurality of fasteners or stud bolts may be used to further couple the wheelchair docking system 1200 to the tracks 212, 214. As shown, a pair of stud or tee-bolts 1310 is shown at approximately each front corner of the system 1200 to add further structural integrity to the overall system.

Figure 14:
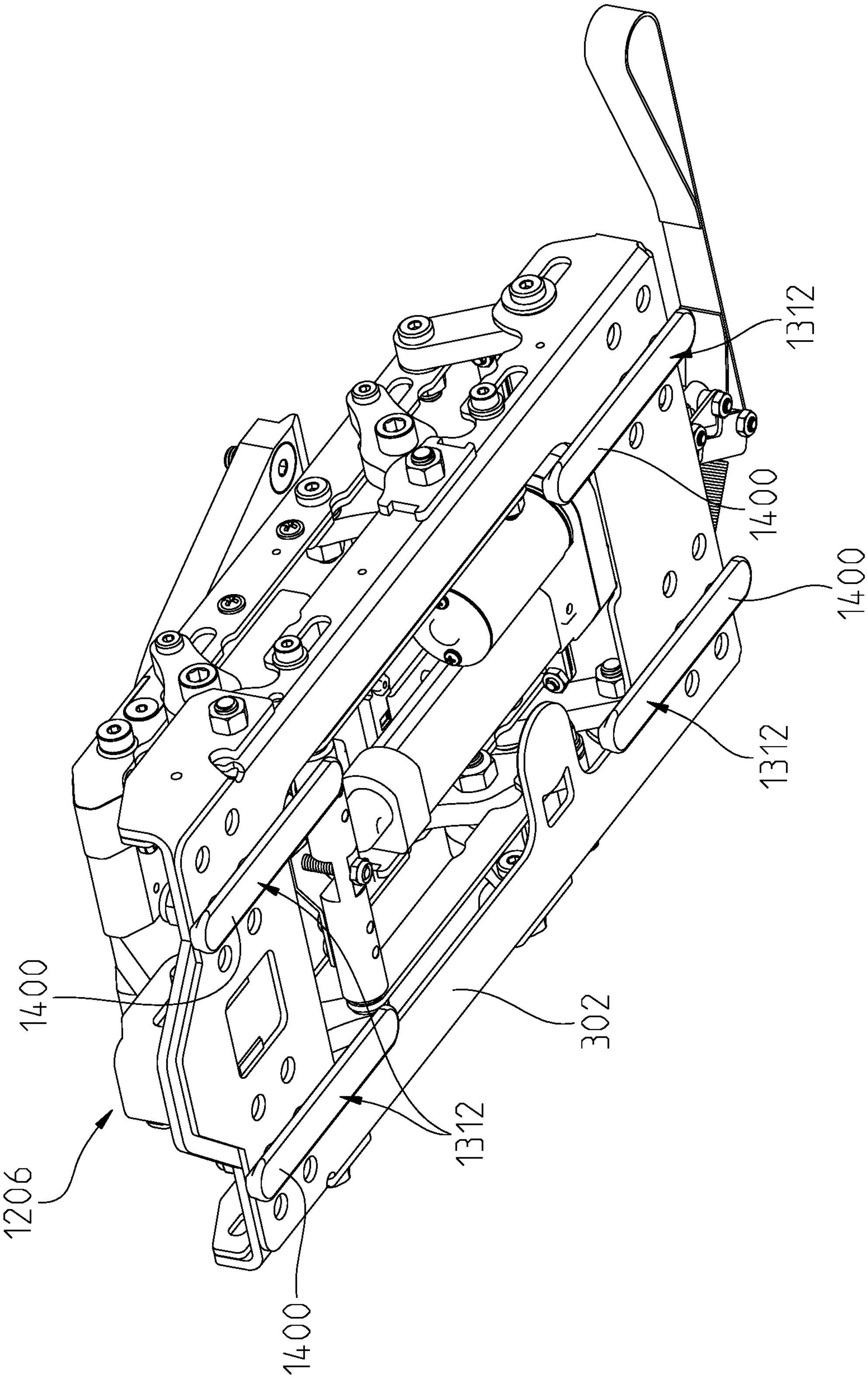
FIG. 14 is a bottom perspective view of the wheelchair docking system of FIG. 12.

Moreover, rather than the adjustable latches of FIG. 9, a different or alternative design may be implemented for movably coupling the docking system 112 to the track system 114. In FIGS. 13 and 14, for example, a tee-bolt 1312 may be used. The tee-bolt 1312 may include an elongated member 1400 configured to slide or move within the channel 1024 of each track. The elongated member 1400 may include a narrow raised portion 1318 that is also capable of moving within the narrow channel 1024. Further, the tee-bolt 1312 may comprise one or more studs 1320 extending from the elongated portion 1400. In FIG. 13, each tee-bolt 1321 includes two studs 1318 extending in a substantially perpendicular direction from the elongated member 1400.

A plurality of fasteners may couple to the studs for securing the tee-bolt to the docking station 112. For example, a first bolt 1314 and a second bolt 1316 are shown in FIG. 13 for each tee-bolt 1312. These bolts or fasteners rigidly couple each stud of the respective tee-bolt 1312 to the docking system 112 to allow the docking system 112 to move smoothly within each track.

As shown, the elongated members 1400 may include a substantially flat bottom surface to allow it to smoothly slide or move within the tracks. The bottom surface of each of the elongated members 1400 may be approximately parallel to a bottom surface of the lower portion 302 of the frame 216, as shown in FIG. 14. This can help ensure smooth movement of the docking system 112 along the tracks.

Figure 15:
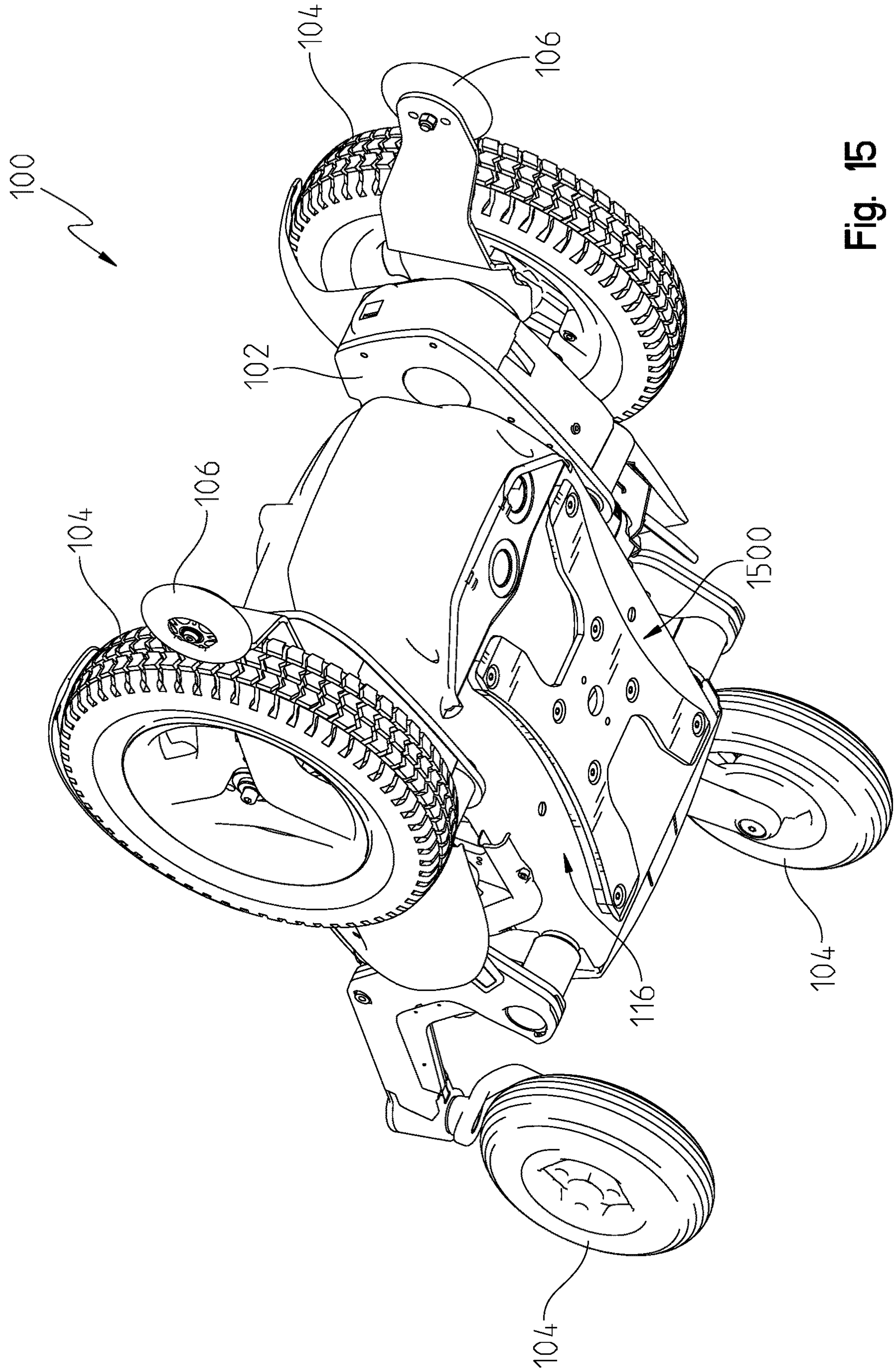
FIG. 15 is a bottom perspective view of a portion of a wheelchair with a coupling device.

Turning to FIG. 15 of the present disclosure, another embodiment of a wheelchair 100 is shown. Similar to FIG. 1, the wheelchair 100 may include a frame 102 supported by one or more wheels 104. A brake or anti-tilt/tip mechanism 106 may be located at one or more wheels 104 for slowing down or keeping the wheels 104 from turning, if necessary. The wheelchair 100 may be a powered wheelchair or a manually-operated wheelchair. Any type of wheelchair 100 is applicable to the present disclosure.

Figure 16:
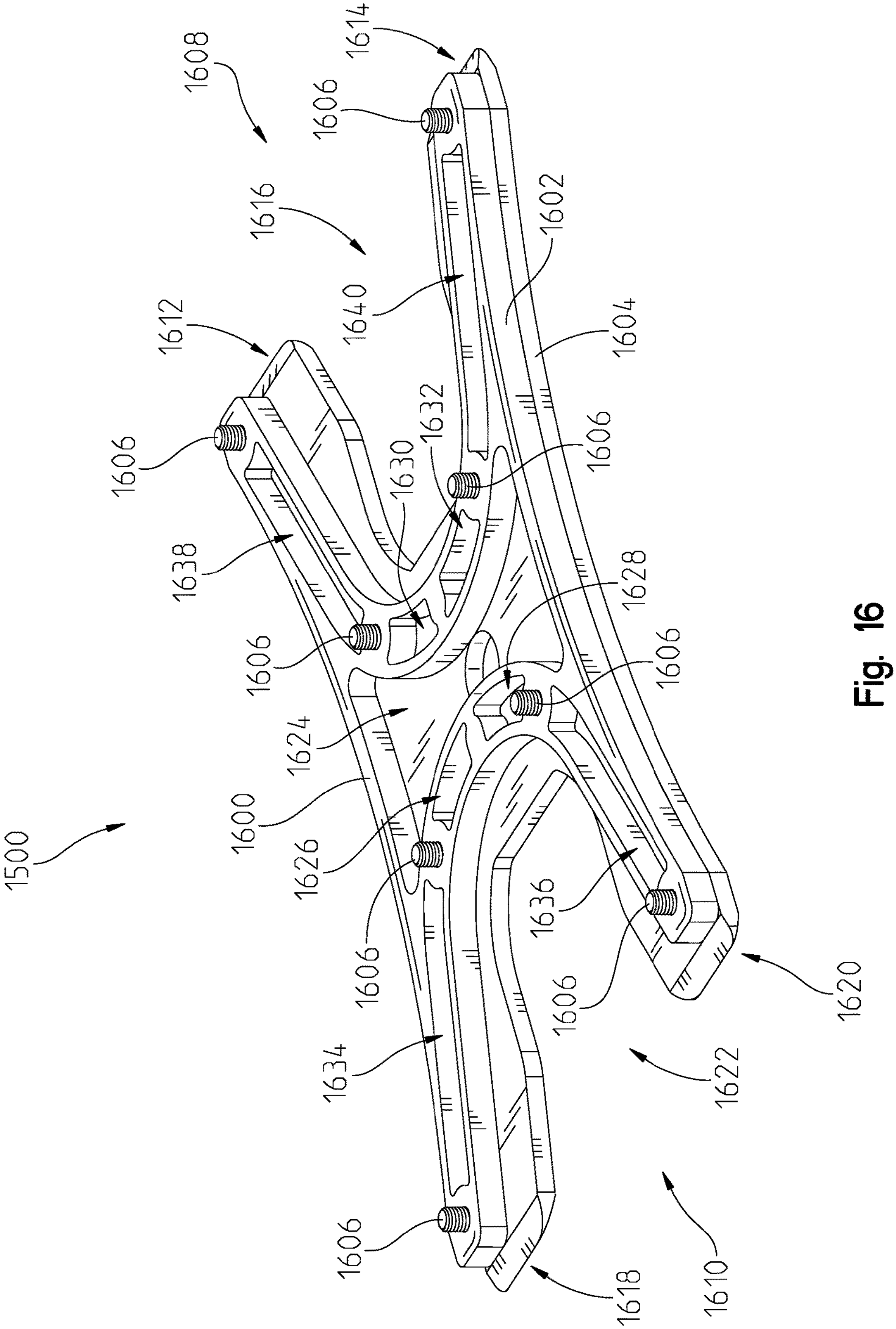
FIG. 16 is a perspective view of the coupling device of FIG. 15.

Although not shown in FIG. 15, a docking system such as one described herein allows for the wheelchair 100 to have greater clearance between it and a vehicle floor. Moreover, the docking system includes at least one latching mechanism for coupling to a coupling device 1500 on the wheelchair 100. For example, the bottom portion of the wheelchair 100 is shown in FIG. 15. Here, the wheelchair 100 has a bottom surface 116 to which the coupling device 1500 is connected via one or more fasteners. The coupling device 1500 may be a substantially double U-shaped or H-shaped bracket assembly 1600 as shown in FIG. 16.

The wheelchair 100 may include a pair of front wheels 104 and a pair of rear wheels 104. The coupling device 1500 may be coupled to the bottom surface 116 such that it is equidistantly spaced between the pair of front wheels and the pair of rear wheels. In other words, the coupling device 1500 may be coupled along a centerline of the wheelchair. Further, it may be coupled to the bottom surface such that it is centered between the front and rear wheels. This positioning, however, is not required. In other embodiments, the coupling device 1500 may be coupled to the bottom surface 116 at different locations.

The bracket assembly 1600 may include a first portion 1602 and a second portion 1604. The first portion 1602 and second portion 1604 may be removably coupled to one another via a plurality of fasteners 1606. Each portion may include a plurality of openings or holes through which the fasteners 1606 are received. When coupled to the wheelchair 100, the first portion 1602 may be directly in contact with the bottom surface 116 of the wheelchair 100.

The bracket assembly 1600 may include a first end 1608 and a second end 1608. Each end may form a substantially U-shaped end as shown in FIG. 16. The first end 1608 may be formed by a first leg assembly 1612 and a second leg assembly 1614. The second end 1610 may be formed by a third leg assembly 1618 and a fourth leg assembly 1620. The first and second legs define a first opening 1616, and the third and fourth legs define a second opening 1622. Each of the first and second opening may be sized for receiving coupler mechanism of the docking station.

Figure 17:
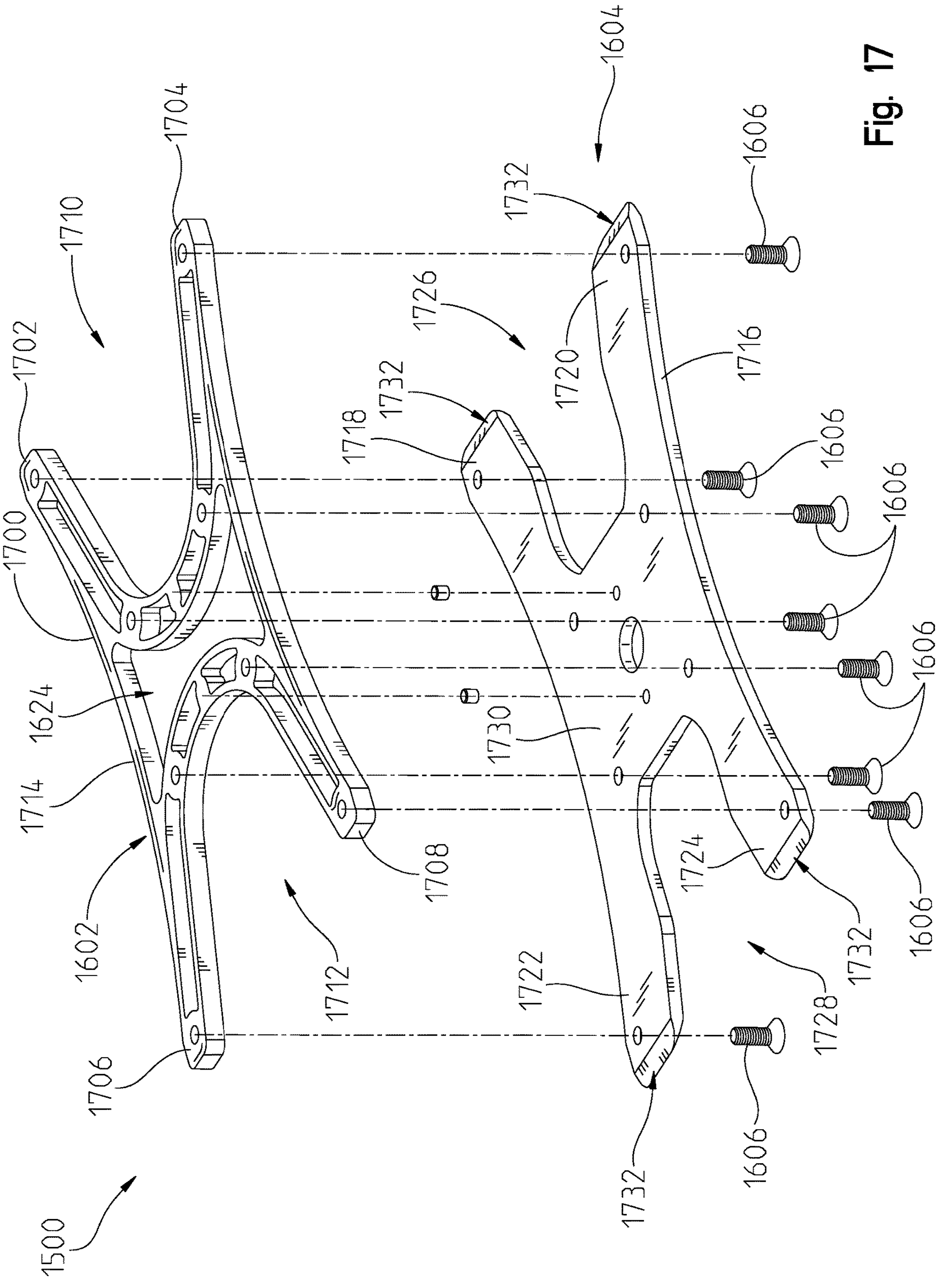
FIG. 17 is an exploded and perspective view of the coupling device of FIG. 15.

As shown in FIGS. 16 and 17, the first portion 1602 of the bracket assembly 1600 may comprise a body 1700 with a plurality of recesses defined therein. For example, a first recess 1624 may be located in a central portion 1714 of the body 1700. Likewise, a second recess 1626, a third recess 1628, a fourth recess 1630 and a fifth recess 1632 may be defined in the central portion 1714. A sixth recess 1634 may be defined in a third leg 1706 of the body 1700 and a seventh recess 1636 may be defined in a fourth leg 1708 thereof. An eighth recess 1638 may be defined in a first leg 1702 of the body 1700, and a ninth recess 1640 may be defined in a second leg 1704 thereof.

The second portion 1604 of the bracket assembly 1600 is formed as a second body 1716 having a central portion 1730, a first leg 1718, a second leg 1720, a third leg 1722, and a fourth leg 1724. Other than the openings or holes for receiving the fasteners 1608, the second body 1716 does not include the recesses as the first body 1700 does. The legs of the first body 1700 are substantially flat, whereas the legs of the second body 1716 include tapered ends 1732 as shown in FIG. 17.

Each leg of the first portion 1602 is about the same length as the corresponding leg of the second portion 1604. The legs of the second portion 1604 are generally wider than the corresponding legs of the first portion 1602. This is shown best in FIG. 16. The tapered ends 1732 of each leg on the second portion 1604 generally extend beyond the substantially flat ends of each leg of the first portion 1602.

The first leg 1702 and second leg 1704 of the first body 1700 may define a first substantially U-shaped end 1710, while the third leg 1706 and fourth leg 1708 may define a second substantially U-shaped end 1712. Similarly, the first leg 1718 and second leg 1720 of the second body 1716 may define a first substantially U-shaped end 1726, while the third leg 1722 and fourth leg 1724 may define a second substantially U-shaped end 1728.

In this embodiment, the first leg 1702 of the first body 1700 is coupled directly to the first leg 1718 of the second body 1716 to form the first leg assembly 1612. Similarly, the second leg 1704 of the first body 1700 and second leg 1720 of the second body 1716 are coupled to one another to form the second leg assembly 1614. In the same way, the third leg 1706 of the first body 1700 and third leg 1722 of the second body 1716 are coupled to form the third leg assembly 1618, and the fourth leg 1708 of the first body 1700 and the fourth leg 1724 of the second body 1716 are coupled to form the fourth leg assembly 1620.

Figure 18:
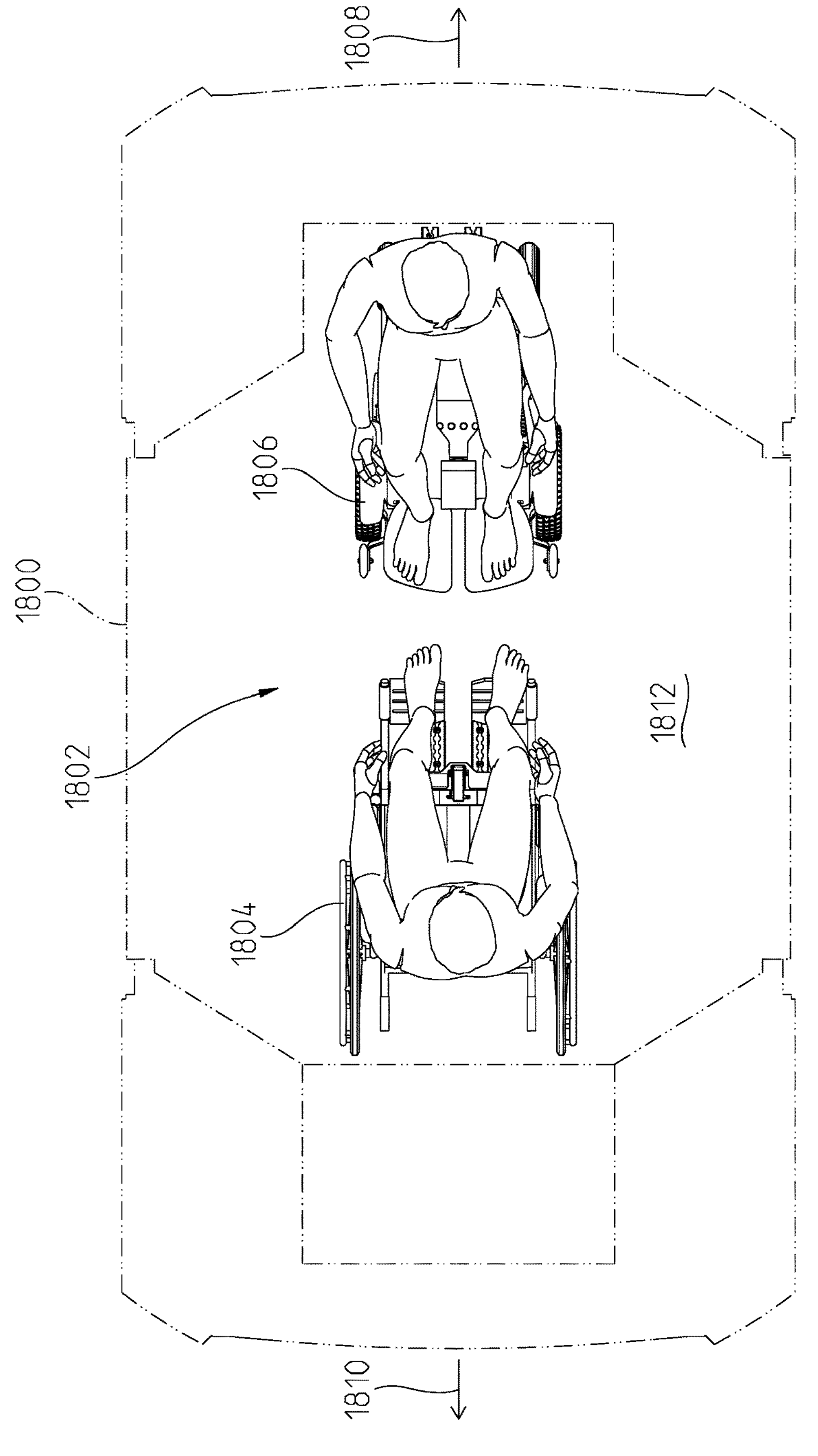
FIG. 18 is a schematic of a top view of an interior of a vehicle with a pair of wheelchairs docked in a first configuration.

The coupling device 1500 of FIGS. 15-17 provides a number of benefits over other conventional docking system coupling devices. In particular, the coupling device 1500 is a multi-directional coupling device which is capable of allowing a wheelchair to couple to a docking system in more than one direction. For example, in FIG. 18, a passenger vehicle 1800 is schematically shown as including an interior 1802 and a floor 1812. Although not shown in FIG. 18, a docking station 112, 1200 may be mounted to the vehicle floor 1812 in at least two locations as shown in FIG. 18. Further, a tracking system (not shown) including a first track 212 and second track 214 may be coupled to the vehicle floor 1812 to which the docking station 112, 1200 is coupled. As previously described, the docking station may include a coupler mechanism 218 for engaging with the multi-directional coupling device 1500 coupled to the bottom surface 116 of the wheelchair.

In FIG. 18, a first wheelchair 1804 and a second wheelchair 1806 are shown. Each wheelchair may include a multi-directional coupling device 1500. With regards to the first wheelchair 1804, the wheelchair 1804 is coupled to the docking station such that a wheelchaired passenger is facing in a first direction 1808. In one example, the first direction 1808 may be a forward travel direction of the vehicle. With regards to the second wheelchair 1806, it is coupled to its docking station such that a wheelchaired passenger is facing in a second direction 1810. In this embodiment, the first direction 1808 is opposite the second direction 1810. Thus, in this example, the wheelchaired passenger may be facing in a rearward travel direction.

In this arrangement of FIG. 18, the first wheelchair 1804 may be aligned with the coupler mechanism 218 of its docking station 112, 1200 such that the coupler mechanism 218 is received within the second opening 1622 of the coupling device 1500. The first opening 1616 is therefore vacant and facing in the first direction 1808 towards the second wheelchair 1806. The second wheelchair 1806 may be aligned with the coupler mechanism 218 of its docking station 112, 1200 such that the coupler mechanism 218 is received within the second opening 1622 of the coupling device 1500. The first opening 1616 of the coupling device 1500 on the second wheelchair 1806 is therefore also vacant and faces in the second direction 1810 towards the first wheelchair 1804. In this arrangement, wheelchaired passengers in the first and second wheelchairs are facing each other.

Figure 19:
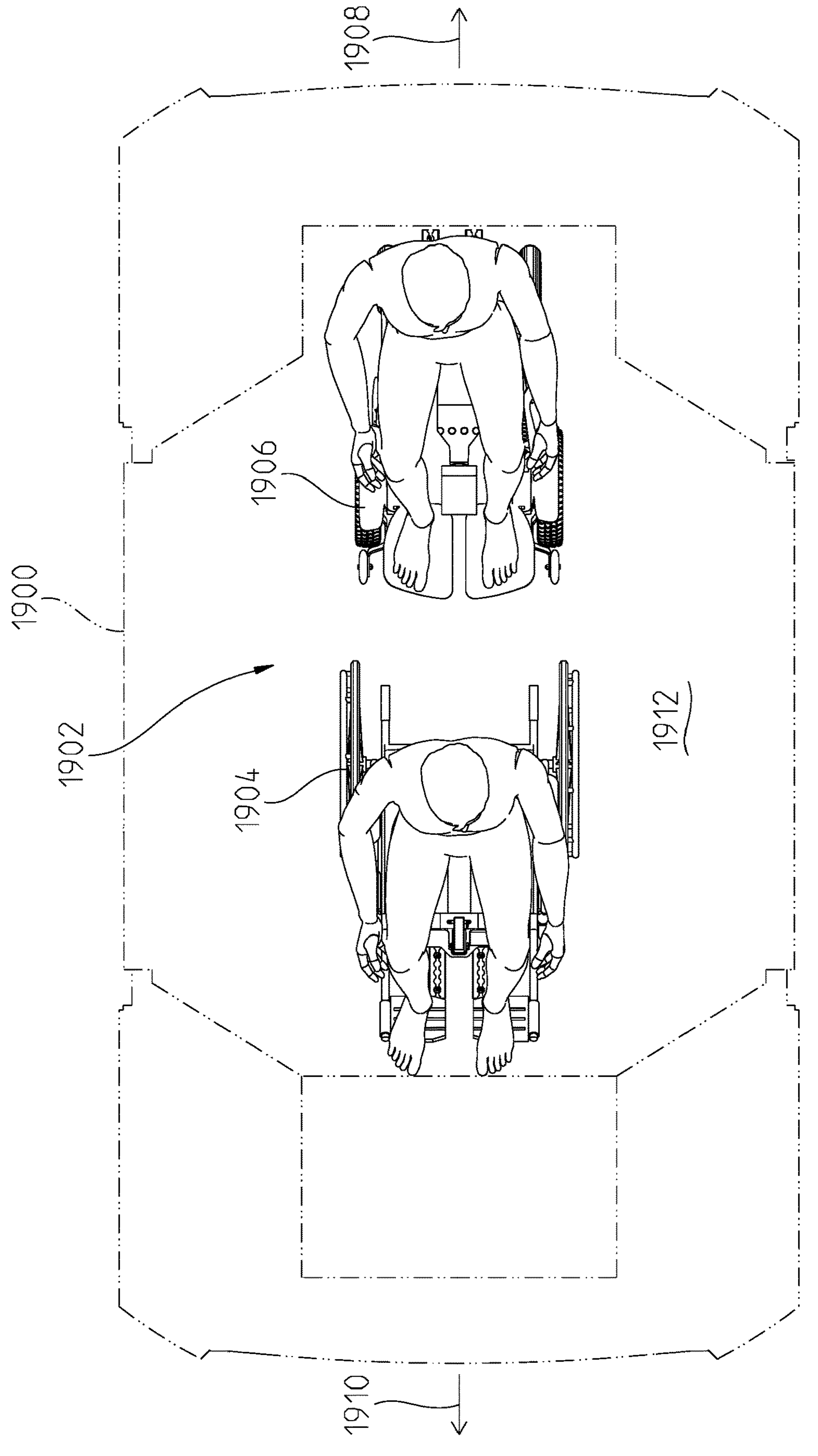
FIG. 19 is a schematic of a top view of an interior of a vehicle with a pair of wheelchairs docked in a second configuration.

In FIG. 19, another passenger vehicle 1900 is shown including an interior 1902 and a vehicle floor 1912. In this example, a first wheelchair 1904 and a second wheelchair 1906 are located in the vehicle and coupled to respective docking stations 112, 1200. Each wheelchair may include its own multi-directional coupling device 1500. As shown, passengers in both wheelchairs are facing in the same direction, i.e., in a second direction 1910 which is opposite a first direction 1908.

In FIG. 19, the docking stations 112, 1200 may be mounted to the vehicle floor 1912 in approximately the same location as those in FIG. 18. Here, however, the first wheelchair 1904 is facing the same direction as the second wheelchair 1906. To reach is orientation, the first wheelchair 1904 may be coupled to its docking station 112, 1200 such that the coupler mechanism 218 of the docking station is received within the first opening 1616 of the coupling device 1500. The second opening 1622 is therefore vacant and facing in the first direction 1908 towards the second wheelchair 1906. In this example, the first wheelchair 1904 may be located in a first or front row of the vehicle 1900 and the second wheelchair 1906 may be located in a second or rear row of the vehicle 1900.

Figure 20:
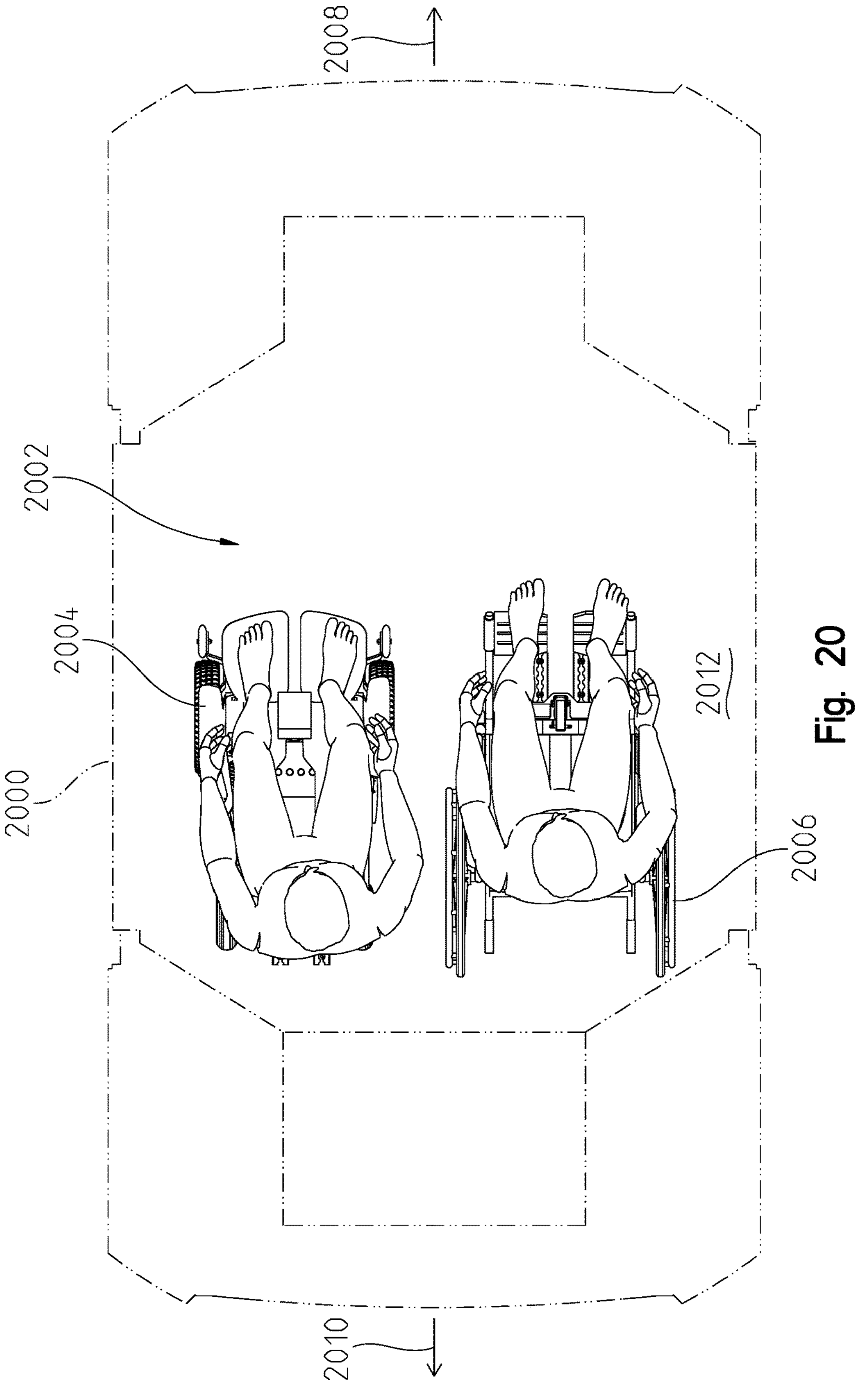
FIG. 20 is a schematic of a top view of an interior of a vehicle with a pair of wheelchairs docked in a third configuration.

Another example is shown in FIG. 20 where a vehicle 2000 may include an interior 2002 and a vehicle floor 2012. In this example, a first wheelchair 2004 and a second wheelchair 2006 are located in the vehicle and coupled to respective docking stations 112, 1200. Each wheelchair may include its own multi-directional coupling device 1500. As shown, passengers in both wheelchairs are facing in the same direction, i.e., in a first direction 2008 which is opposite a second direction 2010.

In FIG. 20, the docking stations 112, 1200 may be mounted to the vehicle floor 2012 side-by-side relative to one another. In other words, the first wheelchair 2004 and second wheelchair 2006 may be disposed in the same row of the vehicle 2000. To reach this orientation, the first wheelchair 1904 may be coupled to its docking station 112, 1200 such that the coupler mechanism 218 of the docking station is received within the second opening 1622 of the coupling device 1500. In the same way, the second wheelchair 1906 may be coupled to its docking station 112, 1200 such that the coupler mechanism 218 of the docking station is received within the second opening 1622 of its coupling device 1500. Thus, the first openings 1616 of both coupling devices 1500 remain vacant and face the first direction 2008.

Other arrangements are possible in this disclosure, and those depicted in FIGS. 18-20 are provided only as non-limiting examples. The coupling device 1500 may be coupled to a docking station in any orientation including perpendicular to or at an angle relative to the first and second directions. As it does couple to the docking station, the coupler mechanism 218 may include a neck portion 402 that extends upwardly from the frame 216 and terminates at a disk-shaped top portion 222. The disk-shaped top portion 222 may contact the first portion 1602 while resting above and/or in contact with a top surface of the second portion 1604 of the coupling device 1500. The neck portion 402 of the coupler mechanism 218 therefore may be in contact with an inner radial surface of the second portion 1604 similar to that shown in FIG. 12. In this way, the coupling device 1500 may be securely coupled to the docking station 112, 1200 in the same way as described herein.

Figure 21:
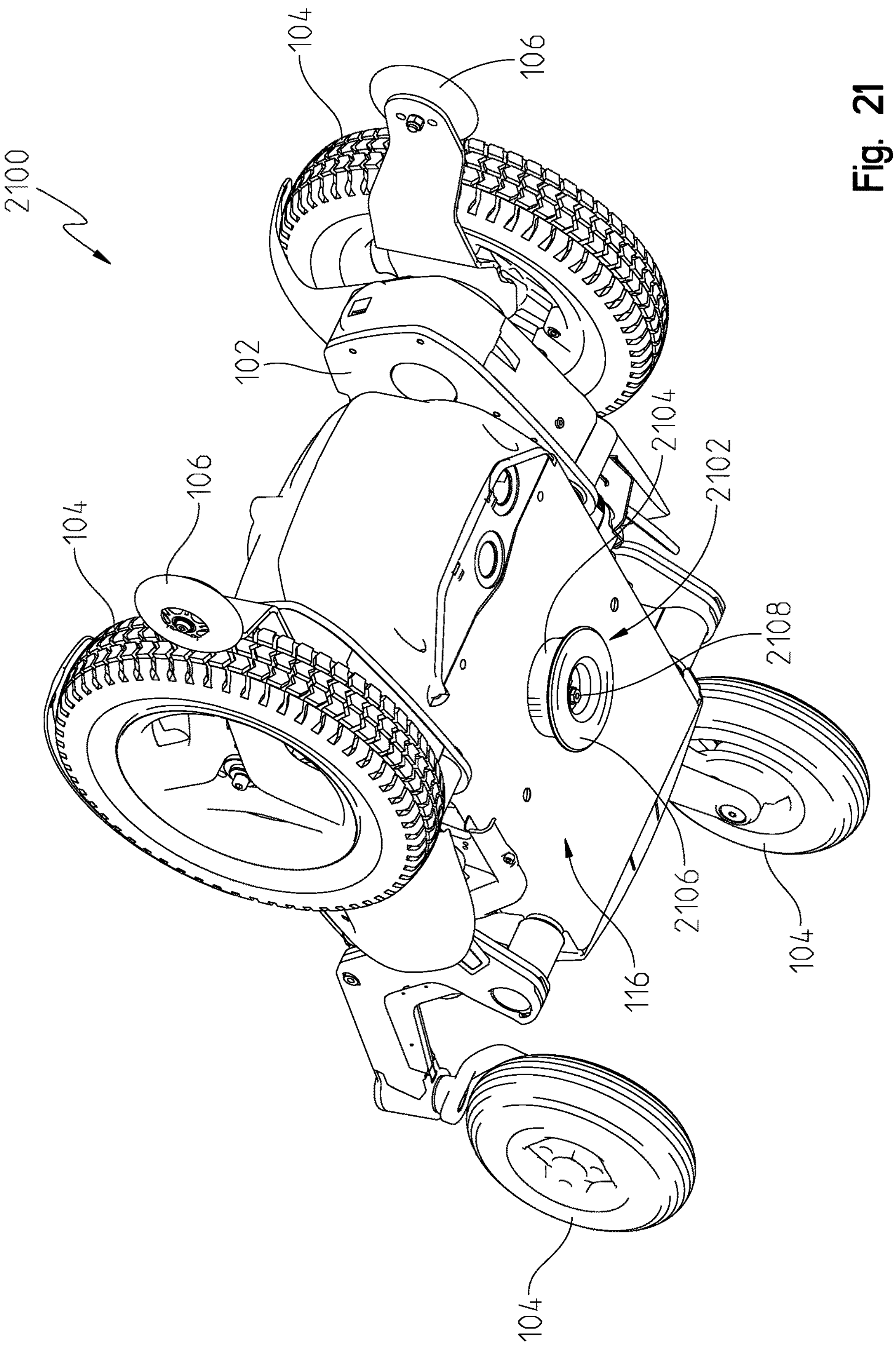
FIG. 21 is a bottom perspective view of a portion of a wheelchair with a coupling device.
Figure 22:
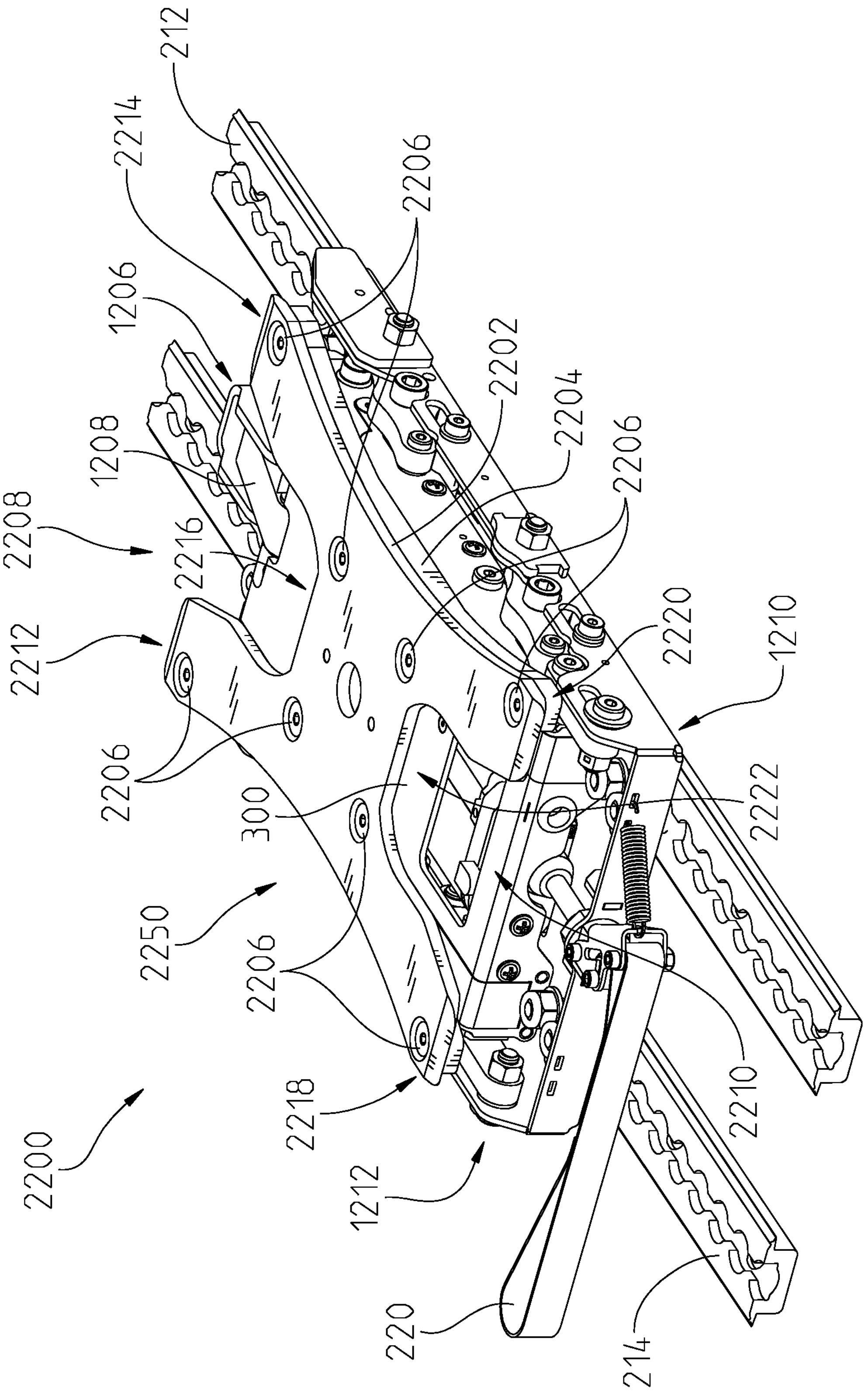
FIG. 22 is a perspective view of a wheelchair docking system and track system for a passenger vehicle in a second configuration.

Referring to FIGS. 21-22, another embodiment of the present disclosure is provided. In this embodiment, an alternative manner in which a wheelchair 2100 is releasably coupled to a docking station 2200 is disclosed. In FIG. 21, for example, the wheelchair 2100 may include a frame 102 supported by one or more wheels 104. A brake or anti-tilt/tip mechanism 106 may be located at one or more wheels 104 for slowing down or keeping the wheels 104 from turning, if necessary. The wheelchair 2100 may be a powered wheelchair or a manually-operated wheelchair. Any type of wheelchair 2100 is applicable to the present disclosure.

The wheelchair 2100 may be adapted for moving in and out of an interior of a vehicle which has a vehicle floor 108 such as shown in FIG. 1. The vehicle floor 108 may be the original OEM vehicle floor, or it may be a modified vehicle floor to accommodate a ramp or wheelchair lift assembly. In any event, the wheelchair 2100 may be maneuvered such that the physically limited individual operating or positioned in the wheelchair may be positioned in any location of the vehicle, including at the driver's position of the vehicle.

In FIG. 21, the bottom portion of the wheelchair 2100 is shown. Here, the wheelchair 2100 has a bottom surface 116 to which a coupling mechanism 2102 may be coupled thereto. For example, the coupling mechanism 2102 may be coupled via one or more fasteners 2108 as shown. Alternatively, the coupling mechanism 2102 may be welded or fixedly mounted to the bottom surface 116. In a further embodiment, the coupling mechanism 2102 may be removably coupled to the bottom surface 116 via a snap-fit connection, a tongue-in-groove connection, a sliding connection, or any other known connection.

The coupling mechanism 2102 may be shaped as a substantially disk or circular shaped mechanism. In FIG. 21, the coupling mechanism 2102 may include a first portion 2104 shaped as a neck portion and a second portion 2106 shaped as a disk-like portion. In this embodiment, the coupling mechanism 2102 may be similarly shaped in a 360° manner. In other words, the coupling mechanism 2102 may engage a docking station in any direction based on the design of FIG. 21. In other embodiments, the coupling mechanism 2102 may be designed in a non-360° manner such that the coupling mechanism 2102 may be engaged at a certain number of directions or angles.

In at least one embodiment, the coupling mechanism 2102 of FIG. 21 may be similar to the coupler mechanism 218 described above.

In FIG. 22, the docking system 2200 may be similar to one of the docking systems described herein. For example, the docking system 2200 may include a first portion 300 and a second portion 302, as described in previous embodiments. In other embodiments, the docking system 2200 may comprise one or more portions. The first portion 300 may be similar to the top portion 300 of the frame 216, and the second portion 302 may be similar to the bottom portion 302 of the frame 216. The docking system 2200 may be movable between a raised position and a lowered position. For example, when the wheelchair 2100 is coupled to the docking system 2200, the docking system 2200 may be in its lowered position. When the wheelchair 2100 is not coupled to the docking system 2200, it may be in its raised position.

In contrast to the embodiment of FIG. 15 where the coupling device 1500 is shown coupled to the bottom of a wheelchair 100, in the embodiment of FIG. 22 a coupling device 2250 may be coupled to the docking system 2200. The coupling device 2250 may be similar to that disclosed above and shown in FIGS. 15-17. In one embodiment, the coupling device 2250 in FIG. 22 is identical to the coupling device 1500 of FIGS. 15-17. In other embodiments, the coupling device 2250 may differ in one or more ways from the coupling device 1500.

In FIG. 22, the coupling device 2250 may include a first portion 2202 and a second portion 2204. The first portion 2202 may be similar to the second portion 1604 of the coupling device 1500 of FIG. 16. Similarly, the second portion 2204 may be similar to the first portion 1602. A plurality of fasteners 2206 may be used for coupling the coupling device 2250 to the docking system 2200. In another embodiment, the coupling device 2250 may be fixedly coupled such as by welding. Other means for coupling the coupling device 2250 to the docking system 2200 may be possible.

The coupling device 2250 may include a first end 2208 and a second end 2210. At the first end 2208, the coupling device 2250 may include a first leg assembly 2212 and a second leg assembly 2214. The first and second leg assemblies may be spaced apart to define a first opening 2216 therebetween. At the second end 2210, the coupling device 2250 may include a third leg assembly 2218 and a fourth leg assembly 2220. The third and fourth leg assemblies may be spaced apart to define a second opening 2222 therebetween. This arrangement is similar to that of FIGS. 15-17. In other embodiments, the coupling device 2250 may include only a single pair of leg assemblies to define a single opening. In yet further embodiments, the coupling device 2250 may include two or more pairs of leg assemblies for defining two or more openings.

During use, the docking system 2200 may be placed on a ground surface or in a transport vehicle such as a passenger vehicle, a taxi, a bus, a train, an airplane, or other type of transport vehicle. The docking system 2200 may be coupled to a pair of tracks 212, 214 as shown in FIG. 22. The docking system 2200 may be maneuvered as necessary along the tracks. In other embodiments, the docking system 2200 may be coupled to the floor of the respective transport vehicle. In yet another embodiment, the docking system may remain stationary on a ground surface or floor of the vehicle.

With the docking system 2200 in a desired location, a wheelchair 2100 may move into engagement with the docking system 2200 by aligning the coupling mechanism 2102 with one of the openings 2216, 2222 of the docking system 2200. The coupling mechanism 2102 may be received in one of the openings as the wheelchair 2100 engages with the docking system 2200. A retractable locking pin 224, a catch device, or other mechanism may further engage the wheelchair 2100 as it is coupled and thus docked to the docking system 2200. One or more actuators may be activated to further couple the wheelchair 2100 to the docking system 2200. Moreover, one or more sensors may detect the engagement of the wheelchair to the docking system and communicate the same to a controller or control system. The controller or control system may be located on the transport vehicle or remote therefrom.

With the multi-directional docking system 2200 of FIG. 22, the wheelchair 2100 may approach the docking system 2200 from either the first end 2208 or the second end 2210. In other embodiments, the docking system 2200 may include a plurality of openings and thus the wheelchair may approach the docking system 2200 from a plurality of directions.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multi-directional docking system for coupling to a wheelchair, comprising:

a frame;

a coupling device coupled to the frame, the coupling device comprising a first opening and a second opening;

a coupling mechanism on the wheelchair; and, wherein, in a coupled configuration, the coupling mechanism is alternatively received in one of the first opening and the second opening of the coupling device for coupling the wheelchair to the docking system and the other one of the first opening and the second opening is uncoupled.

2. The docking system of claim 1, further comprising a first leg, a second leg, a third leg;

wherein, the first leg and the second leg define the first opening for receiving the coupling mechanism on the wheelchair and the third leg and a fourth leg define the second opening for receiving the coupling mechanism on the wheelchair.

3. The docking system of claim 1, wherein the first opening is formed at a first end of the coupling device, and the second opening is formed at a second end thereof.

4. The docking system of claim 1, wherein the first opening is approximately 180° spaced from the second opening.

5. The docking system of claim 1, wherein-the coupling device comprises a first portion and a second portion collectively defining the first opening and the second opening, and wherein a width of the first and second openings at the first portion is less than a width of the first and second openings at the second portion.

6. The docking system of claim 2, wherein the coupling device comprises a first portion and a second portion collectively defining the first leg, the second leg, the third leg, and the fourth leg, wherein a width of each of the first leg, the second leg, the third leg, and the fourth leg at the first portion is greater than a width of the first leg, the second leg, the third leg, and the fourth leg at the second portion.

7. The docking system of claim 1, wherein the coupling device is mechanically coupled to the frame via one or more fasteners.

8. A transport vehicle, comprising:

a floor;

a multi-directional docking system adjustably coupled to the floor, the multi-directional docking system comprising a frame and a coupling device coupled to the frame, wherein the coupling device comprises a first opening and a second opening; and, a wheelchair configured to be removably coupled to the docking system, the wheelchair comprising a frame, at least one wheel coupled to the frame, and a coupling mechanism;

wherein, in a coupled configuration, the coupling mechanism is alternatively received in one of the first opening and the second opening of the coupling device for coupling the wheelchair to the docking system and the other one of the first opening and the second opening is uncoupled.

9. The transport vehicle of claim 8, wherein the coupling device further comprises a first leg, a second leg, a third leg, and a fourth leg;

wherein, the first leg and the second leg define the first opening for receiving the coupling mechanism on the wheelchair and the third leg and fourth leg define the second opening for receiving the coupling mechanism on the wheelchair.

10. The transport vehicle of claim 8, wherein the first opening is formed at a first end of the coupling device, and the second opening is formed at a second end thereof.

11. The transport vehicle of claim 8, wherein the first opening is approximately 180° spaced from the second opening.

12. The transport vehicle of claim 8, wherein the coupling device comprises a first portion and a second portion collectively defining the first opening and the second opening, and wherein a width of the first and second openings at the first portion is less than a width of the first and second openings at the second portion.

13. The transport vehicle of claim 9, wherein the coupling device comprises a first portion and a second portion collectively defining the first leg, the second leg, the third leg, and the fourth leg, wherein a width of each of the first leg, the second leg, the third leg, and the fourth leg at the first portion is greater than a width of the first leg, the second leg, the third leg, and the fourth leg at the second portion.

14. The transport vehicle of claim 8, wherein the coupling device is mechanically coupled to the frame of the docking system via one or more fasteners.

15. The transport vehicle of claim 8, wherein the multi-directional docking system comprises a locking mechanism for coupling the wheelchair to the docking system.

16. The transport vehicle of claim 8, wherein the coupling mechanism is coupled to a bottom portion of the wheelchair, the coupling mechanism comprising a first portion and a second portion;

wherein, the first portion is coupled directly to the bottom portion of the wheelchair and is radially smaller than the second portion.

17. The transport vehicle of claim 8, further comprising a sensor for detecting the coupling mechanism of the wheelchair relative to the coupling device.

18. A system for restricting movement of a wheelchair, the wheelchair including a coupling mechanism, comprising:

a multi-directional docking system comprising a frame and a coupling device coupled to the frame;

a coupling mechanism on the wheelchair;

a first opening for receiving the coupling mechanism on the wheelchair;

a second opening for receiving the coupling mechanism on the wheelchair; and a releasably engageable locking mechanism for coupling the wheelchair to the docking system;

wherein, in a coupled configuration, the coupling mechanism is alternatively received in the first opening or the second opening of the coupling device and the other one of the first opening and the second opening is uncoupled.

19. The system of claim 18, wherein, in the coupled configuration, the releasably engageable locking mechanism is engaged for coupling the wheelchair to the docking system.

20. The system of claim 18, wherein the coupling device comprises a first portion and a second portion collectively defining the first opening and the second opening, and wherein a width of the first and second openings at the first portion is less than a width of the first and second openings at the second portion.

* * * * *